US010531551B2

(12) United States Patent
Yabu et al.

(10) Patent No.: US 10,531,551 B2
(45) Date of Patent: Jan. 7, 2020

(54) EXTREME ULTRAVIOLET LIGHT GENERATING APPARATUS

(71) Applicant: Gigaphoton Inc., Tochigi (JP)

(72) Inventors: Takayuki Yabu, Oyama (JP); Yuichi Nishimura, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/955,031

(22) Filed: Apr. 17, 2018

(65) Prior Publication Data

US 2018/0235064 A1 Aug. 16, 2018

Related U.S. Application Data

(63) Continuation of application No. PCT/JP2015/083299, filed on Nov. 26, 2015.

(51) Int. Cl.
*H05G 2/00* (2006.01)
*H01S 3/10* (2006.01)

(52) U.S. Cl.
CPC .................................. *H05G 2/008* (2013.01)

(58) Field of Classification Search
CPC ........ H05G 2/003; H05G 2/005; H01S 3/005; H01S 3/0071; H01S 3/10; H01S 3/1305;
(Continued)

(56) References Cited

U.S. PATENT DOCUMENTS 8,957,356 B2 * 2/2015 Moriya ................. G01J 1/4257 250/201.9
9,184,551 B2 * 11/2015 Suganuma .......... H01S 3/10023
(Continued)

FOREIGN PATENT DOCUMENTS

JP 2013-84807 A 5/2013
JP 2013-535824 A 9/2013
(Continued)

OTHER PUBLICATIONS

International Search Report issued in PCT/JP2015/083299; dated Mar. 1, 2016.

(Continued)

*Primary Examiner* — David A Vanore
(74) *Attorney, Agent, or Firm* — Studebaker & Brackett PC

(57) ABSTRACT

The extreme ultraviolet light generating apparatus includes a target supply unit to output a target, a driver laser to output a driver laser beam with which the target is irradiated, a guide laser to output a guide laser beam, a beam combiner to have optical paths of the driver laser beam and the guide laser beam substantially coincide with each other and output these beams, a first optical element including a first actuator to adjust an optical path of the driver laser beam to be incident on the beam combiner, a second optical element including a second actuator to adjust an optical path of the guide laser beam to be incident on the beam combiner, a sensor to detect the guide laser beam outputted from the beam combiner to output detected data, and a controller to receive the detected data, control the second actuator based on the detected data, and control the first actuator based on an amount of controlling of the second actuator.

20 Claims, 16 Drawing Sheets

(58) Field of Classification Search
CPC ........ H01S 3/101; H01S 3/13; G03F 7/70033; G03F 7/70191; G03F 7/70525; G03F 7/70808; H01L 21/2026; H01L 21/67115; H05H 1/24
USPC ....... 250/504 R, 201.9; 315/111.21; 356/512
See application file for complete search history.

(56) References Cited

U.S. PATENT DOCUMENTS

| | | | | |
|---|---|---|---|---|
| 9,265,136 | B2 * | 2/2016 | Hori | H01S 3/2308 |
| 9,325,150 | B2 * | 4/2016 | Moriya | H05G 2/008 |
| 9,888,555 | B2 * | 2/2018 | Ando | H05G 2/008 |
| 10,050,408 | B2 * | 8/2018 | Suzuki | H01S 3/23 |
| 10,057,972 | B2 * | 8/2018 | Ueno | H01L 21/027 |
| 10,102,938 | B2 * | 10/2018 | Yabu | G03F 7/70033 |
| 10,111,312 | B2 * | 10/2018 | Suzuki | H05G 2/005 |
| 10,225,918 | B2 * | 3/2019 | Nishimura | H05G 2/008 |
| 10,271,414 | B2 * | 4/2019 | Satou | H01S 3/10 |
| 10,290,992 | B2 * | 5/2019 | Umeda | H01L 21/2026 |
| 10,303,061 | B2 * | 5/2019 | Nishimura | G03F 7/70033 |
| 2010/0117009 | A1 * | 5/2010 | Moriya | H01S 3/1305<br>250/504 R |
| 2010/0140512 | A1 * | 6/2010 | Suganuma | G03F 7/70033<br>250/504 R |
| 2012/0019826 | A1 | 1/2012 | Graham et al. | |
| 2013/0043401 | A1 | 2/2013 | Graham et al. | |
| 2014/0191108 | A1 | 7/2014 | Moriya et al. | |
| 2015/0264792 | A1 * | 9/2015 | Suzuki | H05G 2/008<br>250/504 R |
| 2015/0296604 | A1 * | 10/2015 | Nagai | H05G 2/006<br>250/504 R |
| 2015/0334814 | A1 * | 11/2015 | Moriya | H05G 2/008<br>250/504 R |
| 2016/0073487 | A1 * | 3/2016 | Yanagida | H05G 2/006<br>250/504 R |
| 2018/0235064 | A1 * | 8/2018 | Yabu | H05G 2/008 |

FOREIGN PATENT DOCUMENTS

| | | | |
|---|---|---|---|
| JP | 2014-531743 | A | 11/2014 |
| WO | 2014/097811 | A1 | 6/2014 |

OTHER PUBLICATIONS

International Preliminary Report on Patentability and Written Opinion issued in PCT/JP2015/083299; dated May 29, 2018.
An Office Action mailed by the Japanese Patent Office dated Sep. 17, 2019, which corresponds to Japanese Patent Application No. 2017-552622 and is related to U.S. Appl. No. 15/955,031.

* cited by examiner

EXTREME ULTRAVIOLET LIGHT GENERATING APPARATUS

TECHNICAL FIELD

The present disclosure relates to an extreme ultraviolet light generating apparatus.

BACKGROUND ART

In recent years, as semiconductor processes become finer, transfer patterns for use in photolithography of semiconductor processes have rapidly become finer. In the next generation, micro-fabrication at 70 nm to 45 nm, and further, micro-fabrication at 32 nm or less would be demanded. In order to meet the demand for, for example, micro-fabrication at 32 nm or less, it is expected to develop an exposure apparatus in which an extreme ultraviolet light generating apparatus for generating extreme ultraviolet (EUV) light at a wavelength of approximately 13 nm is combined with a reduced projection reflective optical system.

Three types of EUV light generating apparatuses have been proposed, which include an LPP (laser produced plasma) type apparatus using plasma generated by irradiating target material with a pulse laser beam, a DPP (discharge produced plasma) type apparatus using plasma generated by an electric discharge, and an SR (synchrotron radiation) type apparatus using synchrotron radiation.

Patent Document 1: US Patent Application Publication No. 2010/117009 A

Patent Document 2: US Patent Application Publication No. 2010/140512 A

SUMMARY

An extreme ultraviolet light generating apparatus according to an aspect of the present disclosure may include a target supply unit configured to output a target toward a predetermined region, a driver laser configured to output a driver laser beam with which the target is irradiated, a guide laser configured to output a guide laser beam, a beam combiner configured to have an optical path of the driver laser beam outputted from the driver laser and an optical path of the guide laser beam outputted from the guide laser substantially coincide with each other and output the driver laser beam and the guide laser beam, a first optical element including a first actuator configured to adjust an optical path of the driver laser beam to be incident on the beam combiner, a second optical element including a second actuator configured to adjust an optical path of the guide laser beam to be incident on the beam combiner, a sensor configured to detect the guide laser beam outputted from the beam combiner to output detected data, and a controller configured to receive the detected data on the guide laser beam detected by the sensor, control the second actuator based on the detected data, and control the first actuator based on an amount of controlling of the second actuator.

An extreme ultraviolet light generating apparatus according to another aspect of the present disclosure may include a target supply unit configured to output a target toward a predetermined region, a pre-pulse laser configured to output a pre-pulse laser beam with which the target is irradiated, a main pulse laser configured to output a main pulse laser beam with which the target is irradiated after the target is irradiated with the pre-pulse laser beam, a first guide laser configured to output a first guide laser beam, a second guide laser configured to output a second guide laser beam, a first beam combiner configured to have an optical path of the pre-pulse laser beam outputted from the pre-pulse laser and an optical path of the first guide laser beam outputted from the first guide laser substantially coincide with each other and output the pre-pulse laser beam and the first guide laser beam, a second beam combiner configured to have an optical path of the main pulse laser beam outputted from the main pulse laser and an optical path of the second guide laser beam outputted from the second guide laser substantially coincide with each other and output the main pulse laser beam and the second guide laser beam, a first optical element including a first actuator configured to adjust an optical path of the pre-pulse laser beam to be incident on the first beam combiner, a second optical element including a second actuator configured to adjust an optical path of the first guide laser beam to be incident on the first beam combiner, a third optical element including a third actuator configured to adjust optical paths of the pre-pulse laser beam and the first guide laser beam each outputted from the first beam combiner, a fourth optical element including a fourth actuator configured to adjust an optical path of the main pulse laser beam to be incident on the second beam combiner, a fifth optical element including a fifth actuator configured to adjust an optical path of the second guide laser beam to be incident on the second beam combiner, a sixth optical element including a sixth actuator configured to adjust optical paths of the main pulse laser beam and the second guide laser beam each outputted from the second beam combiner, a third beam combiner configured to have an optical path of the pre-pulse laser beam outputted from the third optical element and an optical path of the main pulse laser beam outputted from the sixth optical element substantially coincide with each other and have an optical path of the first guide laser beam outputted from the third optical element and an optical path of the second guide laser beam outputted from the sixth optical element substantially coincide with each other, a sensor configured to detect the first and second guide laser beams outputted from the third beam combiner to output detected data, and a controller configured to control the second actuator based on the detected data on the first guide laser beam detected by the sensor, control the first actuator based on an amount of controlling of the second actuator, control the fifth actuator based on the detected data on the second guide laser beam detected by the sensor, and control the fourth actuator based on an amount of controlling of the fifth actuator.

An extreme ultraviolet light generating apparatus according to another aspect of the present disclosure may include a target supply unit configured to output a target toward a predetermined region, a driver laser configured to output a driver laser beam with which the target is irradiated, a guide laser configured to output a guide laser beam with which the target is irradiated, an optical element including an actuator configured to adjust optical paths of the driver laser beam outputted from the driver laser and the guide laser beam outputted from the guide laser, an image sensor configured to detect an image of reflected light reflected by the target irradiated with the guide laser beam, and a controller configured to control the actuator based on an output from the image sensor.

BRIEF DESCRIPTION OF DRAWINGS

Embodiments of the present disclosure will be described below as mere examples with reference to the appended drawings.

DESCRIPTION OF EMBODIMENTS

Contents

1. Overall. Description of Extreme Ultraviolet Light Generating System
  1.1 Configuration
  1.2 Operation
2. EUV Light Generating Apparatus of Comparative Example
  2.1 Configuration
    2.1.1 Target Supply Unit
    2.1.2 Laser Apparatus
    2.1.3 Laser Beam Direction Control Unit
    2.1.4 Laser Beam Focusing Optical System
  2.2 Operation
    2.2.1 Outputting Target
    2.2.2 Generating Plasma
  2.3 Problem
3. EUV Light Generating Apparatus Including Guide Laser
  3.1 Configuration
  3.2 Operation
  3.3 Effect
4. EUV Light Generating Apparatus That Detects Light Reflected by Target
  4.1 Configuration
  4.2 Principle of Detecting Optical Path Axis of Laser Beam Based on Reflected Light
  4.3 Operation
  4.4 Effect
5. EUV Light Generating Apparatus Including Actuator with Improved Responsiveness
6. EUV Light Generating Apparatus to Adjust Positions of Guide Laser Beam and Driver Laser Beam Simultaneously
  6.1 Configuration
  6.2 Operation
7. Examples of Sensor
  7.1 First Example
    7.1.1 Configuration
    7.1.2 Operation
  7.2 Second Example
  7.3 Third Example
    7.3.1 Configuration
    7.3.2 Operation
8. Configuration of Controller Embodiments of the present disclosure will be described in detail below with reference to the drawings. The embodiments described below may indicate several examples of the present disclosure and may not intend to limit the content of the present disclosure. Not all of the configurations and operations described in the embodiments are indispensable in the present disclosure. Identical reference symbols may be assigned to identical constituent elements and redundant descriptions thereof may be omitted.

1. Overall Description of Extreme Ultraviolet Light Generating System

1.1 Configuration

Figure 1:
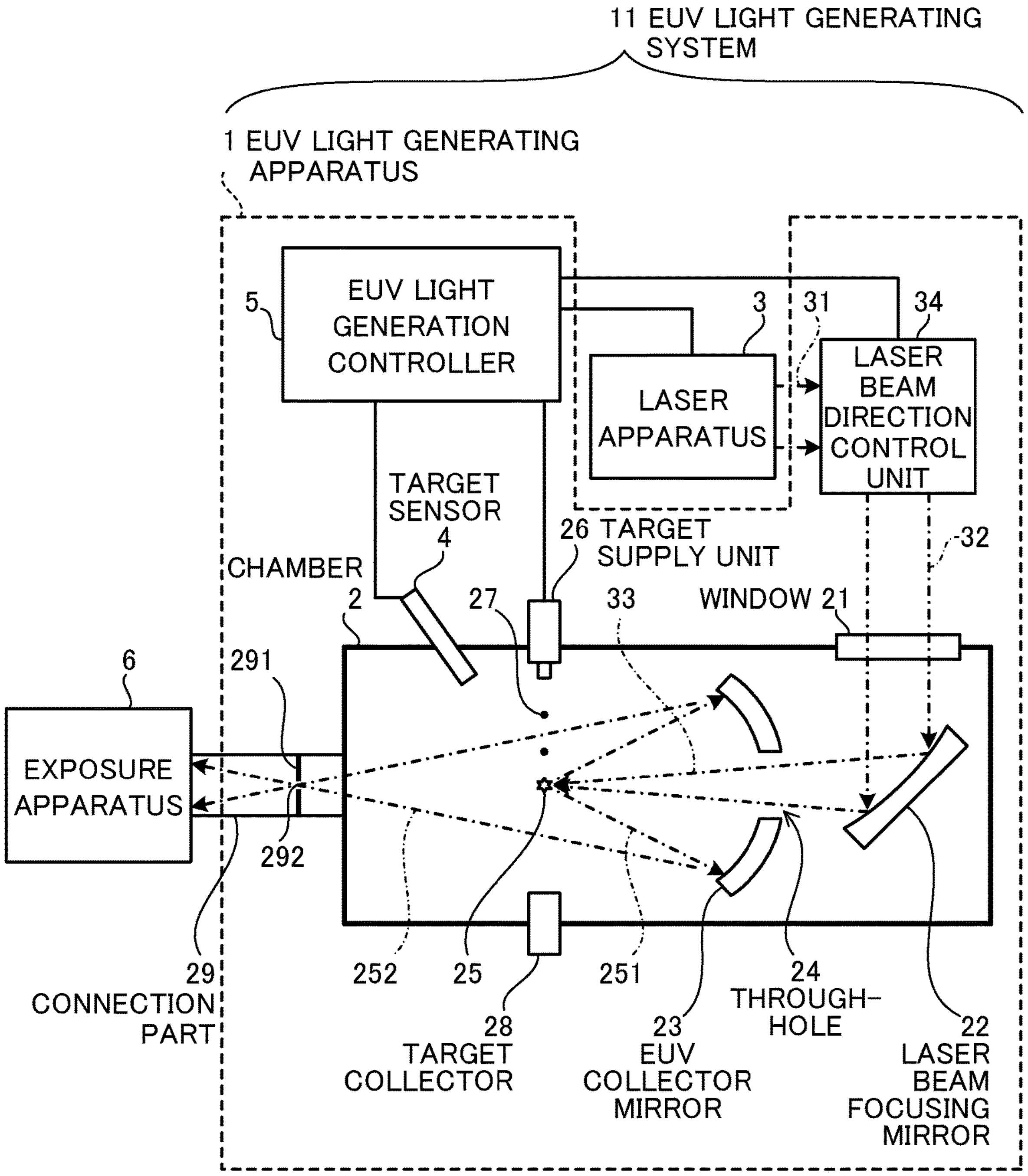
FIG. 1 schematically shows an exemplary configuration of an LPP type EUV light generating system.

FIG. 1 schematically shows an exemplary configuration of an LPP type EUV light generating system. An EUV light generating apparatus 1 may be used with at least one laser apparatus 3. In the present application, a system including the EUV light generating apparatus 1 and the laser apparatus 3 may be referred to as an EUV light generating system 11. As shown in FIG. 1 and described in detail below, the EUV light generating apparatus 1 may include a chamber 2 and a target supply unit 26. The chamber 2 may be sealed airtight. The target supply unit 26 may be provided, for example, to penetrate a wall of the chamber 2. A target material supplied by the target supply unit 26 may include, but not be limited to, tin, terbium, gadolinium, lithium, or a combination of any two or more of them.

The chamber 2 may have at least one through-hole formed in its wall. A window 21 may be provided at the through-hole. A pulse laser beam 32 outputted from the laser apparatus 3 may be transmitted by the window 21. An EUV collector mirror 23 having a spheroidal reflective surface, for example, may be provided in the chamber 2. The EUV collector mirror 23 may have first and second focal points. The surface of the EUV collector mirror 23 may have, for example, a multi-layered reflective film in which molybdenum layers and silicon layers are alternately laminated. The EUV collector mirror 23 is preferably arranged such that, for example, the first focal point is positioned in a plasma generation region 25 and the second focal point is positioned in an intermediate focus region (IF) 292. The EUV collector mirror 23 may have a through-hole 24 at the center thereof, and a pulse laser beam 33 may pass through the through-hole 24.

The EUV light generating apparatus 1 may further include an EUV light generation controller 5 and a target sensor 4. The target sensor 4 may have a photographing function and may be configured to detect the presence, actual path, position, speed or the like of a target 27.

Further, the EUV light generating apparatus 1 may include a connection part 29 for allowing the interior of the chamber 2 to be in communication with the interior of an exposure apparatus 6. In the connection part 29, a wall 291 with an aperture may be provided. The wall 291 may be positioned such that the second focal point of the EUV collector mirror 23 lies in the aperture formed in the wall 291.

Furthermore, the EUV light generating apparatus 1 may include a laser beam direction control unit 34, a laser beam focusing mirror 22, a target collector 28 for collecting the target 27, and the like. The laser beam direction control unit 34 may include an optical system for defining the traveling direction of the pulse laser beam and an actuator for adjusting the position, the posture, or the like of the optical system.

1.2 Operation

With continued reference to FIG. 1, a pulse laser beam 31 outputted from the laser apparatus 3 may enter the laser beam direction control unit 34 and be outputted therefrom as the pulse laser beam 32. The pulse laser beam 32 may be transmitted by the window 21 to enter the chamber 2. The pulse laser beam 32 may travel inside the chamber 2 along at least one laser beam optical path, be reflected by the laser beam focusing mirror 22, and be incident on the target 27 as the pulse laser beam 33.

The target supply unit 26 may be configured to output the target 27 toward the plasma generation region 25 in the chamber 2. The target 27 may be irradiated with at least one pulse of the pulse laser beam 33. The target 27 irradiated with the pulse laser beam 33 may be turned into plasma that emits rays of light 251. EUV light included in the rays of light 251 may be reflected by the EUV collector mirror 23 at a higher reflectance than light in other wavelength regions. Reflected light 252 including the EUV light reflected by the EUV collector mirror 23 may be collected at the intermediate focus region 292 and outputted to the exposure apparatus 6.

The EUV light generation controller 5 may be configured to integrally control the EUV light generating system 11. The EUV light generation controller 5 may process image data or the like of the target 27 photographed by the target sensor 4. Further, the EUV light generation controller 5 may control the timing at which the target 27 is outputted, the direction in which the target 27 is outputted, and the like. Furthermore, the EUV light generation controller 5 may control the oscillation timing of the laser apparatus 3, the traveling direction of the pulse laser beam 32, the focus position of the pulse laser beam 33, and the like. The various controls described above are merely examples, and other controls may be added as necessary.

2. EUV Light Generating Apparatus of Comparative Example

2.1 Configuration

Figure 2:
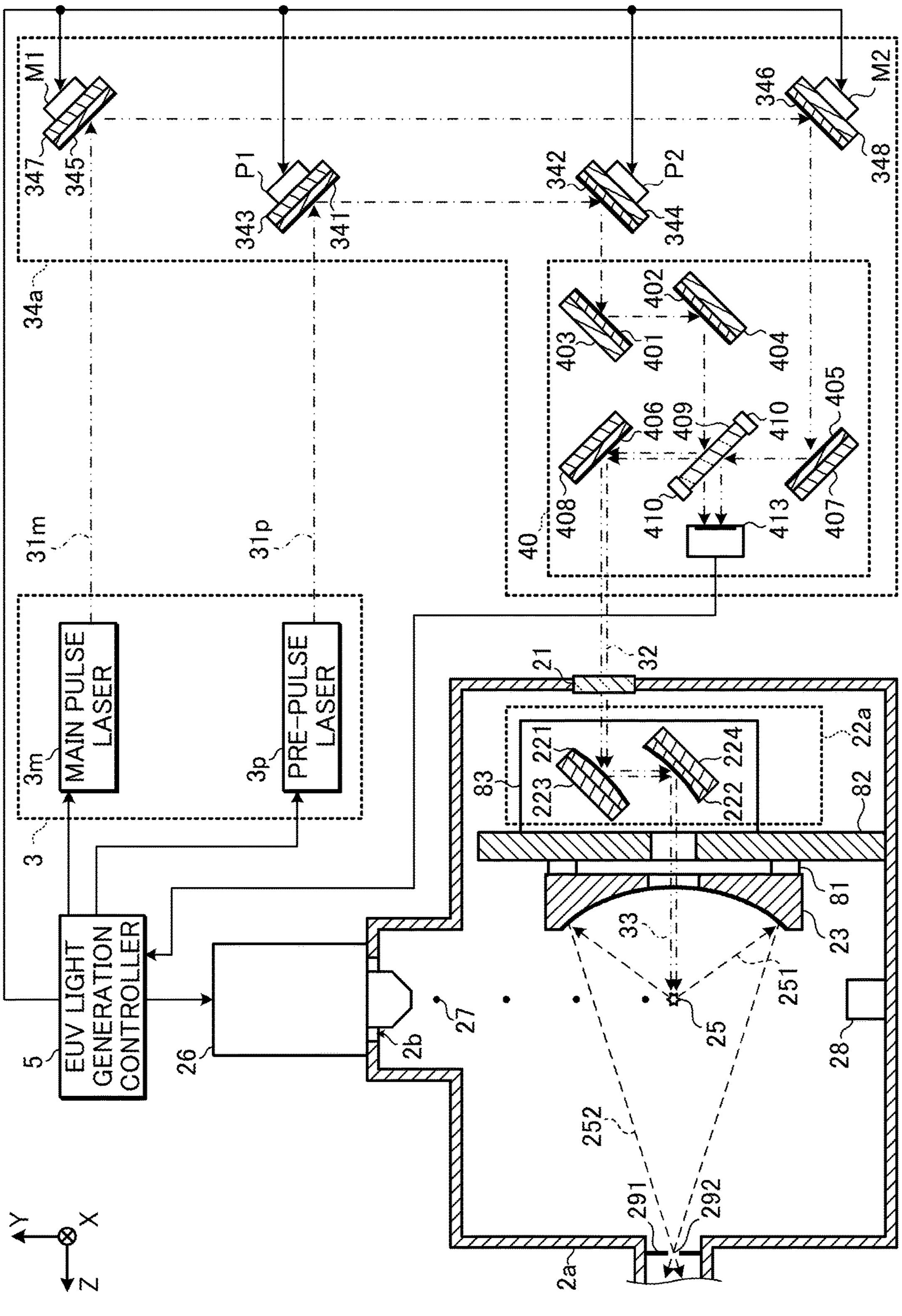
FIG. 2 schematically shows a configuration of an EUV light generating system according to a comparative example of the present disclosure.

FIG. 2 schematically shows a configuration of an EUV light generating system according to a comparative example of the present disclosure. As shown in FIG. 2, an output direction of the EUV light may be a Z direction. A direction opposite to an output direction of the target may be a Y direction. A direction perpendicular to both the Z direction and the Y direction may be an X direction. FIG. 2 shows the EUV light generating system as viewed in the X direction.

2.1.1 Target Supply Unit

The target supply unit 26 may be arranged to penetrate a wall of a chamber 2*a* via a through-hole 2*b*. An unillustrated sealer may be provided between the target supply unit 26 and a surrounding portion of the wall of the chamber 2*a* surrounding the through-hole 2*b*. This sealer may seal the gap between the target supply unit 26 and the surrounding portion surrounding the through-hole 2*b*.

The target supply unit 26 may store molten target material. The target material may be pressurized by inert gas supplied into the target supply unit 26. The target supply unit 26 may have an unillustrated opening at a position in the chamber 2*a*. An unillustrated vibrator may be attached to the target supply unit 26 in the vicinity of the opening. The target supply unit 26 may be configured to output the target 27 toward the plasma generation region 25 according to a control signal outputted from the EUV light generation controller 5.

2.1.2 Laser Apparatus

The laser apparatus 3 may include a pre-pulse laser 3*p* and a main pulse laser 3*m*. The pre-pulse laser 3*p* may output a pre-pulse laser beam 31*p* according to a control signal outputted from the EUV light generation controller 5. The main pulse laser 3*m* may output a main pulse laser beam 31*m* according to a control signal outputted from the EUV light generation controller 5. The wavelength of the main pulse laser beam 31*m* may be longer than that of the pre-pulse laser beam 31*p*. The energy of the main pulse laser beam 31*m* may be higher than that of the pre-pulse laser beam 31*p*. The pre-pulse laser 3*p* and the main pulse laser 3*m* may each correspond to a driver laser in the present disclosure. The pre-pulse laser beam 31*p* and the main pulse laser beam 31*m* may each correspond to a driver laser beam in the present disclosure.

2.1.3 Laser Beam Direction Control Unit

A laser beam direction control unit 34*a* provided outside the chamber 2*a* may include high-reflective mirrors 341 and 342. The high-reflective mirrors 341 and 342 may be provided in an optical path of the pre-pulse laser beam 31*p* outputted from the pre-pulse laser 3*p*. The high-reflective mirror 341 may be held by a holder 343. The high-reflective mirror 342 may be held by a holder 344. The holder 343 may be equipped with an actuator P1. The holder 344 may be equipped with an actuator P2. The high-reflective mirror 341 may reflect the pre-pulse laser beam 31*p*. The high-reflective mirror 342 may reflect the pre-pulse laser beam 31*p* reflected by the high-reflective mirror 341.

The laser beam direction control unit 34*a* may further include high-reflective mirrors 345 and 346. The high-reflective mirrors 345 and 346 may be provided in an optical path of the main pulse laser beam 31*m* outputted from the main pulse laser 3*m*. The high-reflective mirror 345 may be held by a holder 347. The high-reflective mirror 346 may be held by a holder 348. The holder 347 may be equipped with an actuator M1. The holder 348 may be equipped with an actuator M2. The high-reflective mirror 345 may reflect the main pulse laser beam 31*m*. The high-reflective mirror 346 may reflect the main pulse laser beam 31*m* reflected by the high-reflective mirror 345.

The laser beam direction control unit 34*a* may further include a beam combiner module 40. The beam combiner module 40 may include high-reflective mirrors 401, 402, 405, and 406, a beam combiner 409, and a sensor 413. The high-reflective mirror 401 may be provided in an optical path of the pre-pulse laser beam 31*p* reflected by the high-reflective mirror 342. The high-reflective mirror 401 may be held by a holder 403. The high-reflective mirror 401 may reflect the pre-pulse laser beam 31*p*. The high-reflective mirror 402 may be provided in an optical path of the pre-pulse laser beam 31*p* reflected by the high-reflective mirror 401. The high-reflective mirror 402 may be held by a holder 404. The high-reflective mirror 402 may reflect the pre-pulse laser beam 31*p*.

The high-reflective mirror 405 may be provided in an optical path of the main pulse laser beam 31*m* reflected by the high-reflective mirror 346. The high-reflective mirror 405 may be held by a holder 407. The high-reflective mirror 405 may reflect the main pulse laser beam 31*m*.

The beam combiner 409 may be provided in an intersecting position where the optical path of the pre-pulse laser beam 31*p* reflected by the high-reflective mirror 402 and the optical path of the main pulse laser beam 31*m* reflected by the high-reflective mirror 405 intersect with each other. The intersecting position of the optical paths may not be limited to a position where the central axis of the optical path of one laser beam intersects with that of the other laser beam. The intersecting position may be a position in an overlapping space where at least a part of the optical path of one laser beam having a certain beam width overlaps with that of the other laser beam. The beam combiner 409 may be held by a holder 410. The beam combiner 409 may reflect the pre-pulse laser beam 31*p* at a high reflectance and transmit the main pulse laser beam 31*m* at a high transmittance. The beam combiner 409 may cause the optical path axis of the pre-pulse laser beam 31*p* and that of the main pulse laser beam 31*m* to substantially coincide with each other. The optical path axis may be the central axis of the optical path. The beam combiner 409 may further transmit a part of the pre-pulse laser beam 31*p* to the sensor 413 and reflect a part of the main pulse laser beam 31*m* to the sensor 413.

The high-reflective mirror 406 may be provided in the optical paths of the pre-pulse laser beam 31*p* reflected by the beam combiner 409 and the main pulse laser beam 31*m* transmitted by the beam combiner 409. The high-reflective mirror 406 may be held by a holder 408. The high-reflective mirror 406 may reflect the pre-pulse laser beam 31*p* and the main pulse laser beam 31*m* to the inside of the chamber 2*a*. In this specification, the pre-pulse laser beam 31*p* and the main pulse laser beam 31*m* both reflected by the high-reflective mirror 406 may be collectively referred to as a pulse laser beam 32.

2.1.4 Laser Beam Focusing Optical System

A laser beam focusing optical system 22*a*, EUV collector mirror holders 81, and plates 82 and 83 may be provided in the chamber 2.

The plate 82 may be fixed to the chamber 2*a*. The EUV collector mirror 23 may be fixed to the plate 82 via the EUV collector mirror holders 81. The plate 83 may be supported by the plate 82. The laser beam focusing optical system 22*a* may include an off-axis paraboloidal convex mirror 221 and an ellipsoid concave mirror 222. The off-axis paraboloidal convex mirror 221 may be held by a holder 223. The ellipsoid concave mirror 222 may be held by a holder 224. The holders 223 and 224 may be fixed to the plate 83.

The off-axis paraboloidal convex mirror 221 may have a reflective convex surface of a paraboloid of revolution. The off-axis paraboloidal convex mirror 221 may be arranged such that the axis of the paraboloid of revolution is substantially parallel to the central axis of the optical path of the pulse laser beam 32 to be incident on the off-axis paraboloidal convex mirror 221.

The ellipsoid concave mirror 222 may have a reflective concave surface of a spheroidal shape. The ellipsoid concave mirror 222 may have a first focal point and a second focal point. The ellipsoid concave mirror 222 may be arranged such that the first focal point of the ellipsoid concave mirror 222 substantially coincides with the focal point of the off-axis paraboloidal convex mirror 221. The second focal point of the ellipsoid concave mirror 222 may be in the plasma generation region 25.

2.2 Operation 2.2.1 Outputting Target

The target material pressurized by the inert gas in the target supply unit 26 may be outputted via the opening. The vibrator may vibrate the target supply unit 26. This may cause the target material to be separated into a plurality of droplets. Each of the droplets may move as the target 27 along a trajectory from the target supply unit 26 to the plasma generation region 25.

2.2.2 Generating Plasma

The pre-pulse laser beam 31*p* outputted from the pre-pulse laser 3*p* and the main pulse laser beam 31*m* outputted from the main pulse laser 3*m* may travel via the laser beam direction control unit 34*a* and be directed to the laser beam focusing optical system 22*a* as the pulse laser beam 32.

The sensor 413 may detect the pre-pulse laser beam 31*p* transmitted by the beam combiner 409 and output the results of the detection to the EUV light generation controller 5. The EUV light generation controller 5 may calculate a beam position and a pointing of the pre-pulse laser beam 31*p* based on the output from the sensor 413. The beam position may be a position on the sensor 413 on which the pulse laser beam is incident. The EUV light generation controller 5 may control the actuator P1 based on the beam position of the pre-pulse laser beam 31*p*. The pointing may be a direction of the pulse laser beam incident on the sensor 413. The EUV light generation controller 5 may control the actuator P2 based on the pointing of the pre-pulse laser beam 31*p*.

The sensor 413 may detect the main pulse laser beam 31*m* reflected by the beam combiner 409 and output the results of the detection to the EUV light generation controller 5. The EUV light generation controller 5 may calculate a beam position and a pointing of the main pulse laser beam 31*m* based on the output from the sensor 413. The EUV light generation controller 5 may control the actuator M1 based on the beam position of the main pulse laser beam 31*m*. The EUV light generation controller 5 may control the actuator M2 based on the pointing of the main pulse laser beam 31*m*.

The pulse laser beam 32 may be beam-expanded by being reflected by the off-axis paraboloidal convex mirror 221 included in the laser beam focusing optical system 22*a*. The pulse laser beam 32 reflected by the off-axis paraboloidal convex mirror 221 may be reflected by the ellipsoid concave mirror 222 and concentrated to the plasma generation region 25 as the pulse laser beam 33. The pulse laser beam 33 may include the pre-pulse laser beam 31*p* and the main pulse laser beam 31*m*.

At a point in time when one target 27 reaches the plasma generation region 25, the target 27 may be irradiated with the pre-pulse laser beam 31*p*. The target 27 irradiated with the pre-pulse laser beam 31*p* may expand or diffuse to turn into a secondary target. At a point in time when the secondary target expands or diffuses to a desired size, the secondary target may be irradiated with the main pulse laser beam 31*m*. The secondary target irradiated with the main pulse laser beam 31*m* may be turned into plasma. The plasma may emit the rays of light 251 including the EUV light.

2.3 Problem

FIGS. 3A to 3E show a relationship between control of the actuator and stability in the energy of the EUV light in the EUV light generating system shown in FIG. 2.

Figure 3A:
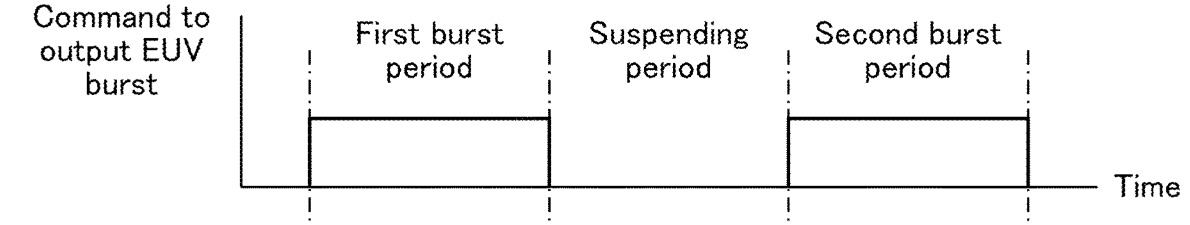
FIGS. 3A to 3E show a relationship between control of an actuator and stability in the energy of EUV light in the EUV light generating system shown in FIG. 2.

FIG. 3A shows a command to output EUV burst. The EUV light generation controller 5 may receive the command to output EUV burst outputted from the exposure apparatus 6. The command to output EUV burst may be a signal designating a burst period for outputting the EUV light at a predetermined repetition frequency and a suspending period for suspending the output of the EUV light. FIG. 3A shows a first burst period, a suspending period after the first burst period, and a second burst period after the suspending period.

In the first or second burst period in which the command to output EUV burst is ON, the EUV light generation controller 5 may have the pre-pulse laser 3*p* and the main pulse laser 3*m* output the respective pulse laser beams. In the suspending period in which the command to output EUV burst is OFF, the EUV light generation controller 5 may have the pre-pulse laser 3*p* and the main pulse laser 3*m* stop outputting the pulse laser beams. In the first and second burst periods and the suspending period, the EUV light generation controller 5 may allow the target supply unit 26 to keep outputting the target 27.

Figure 3B:
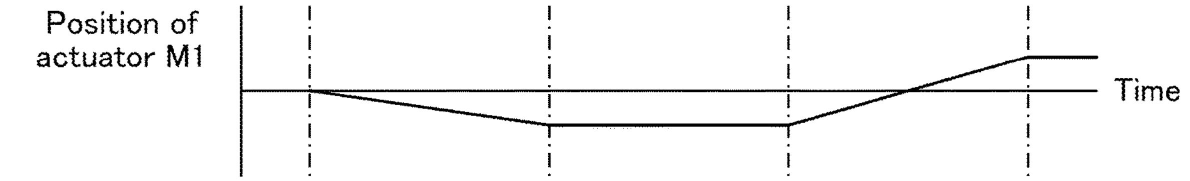
Figure 3C:
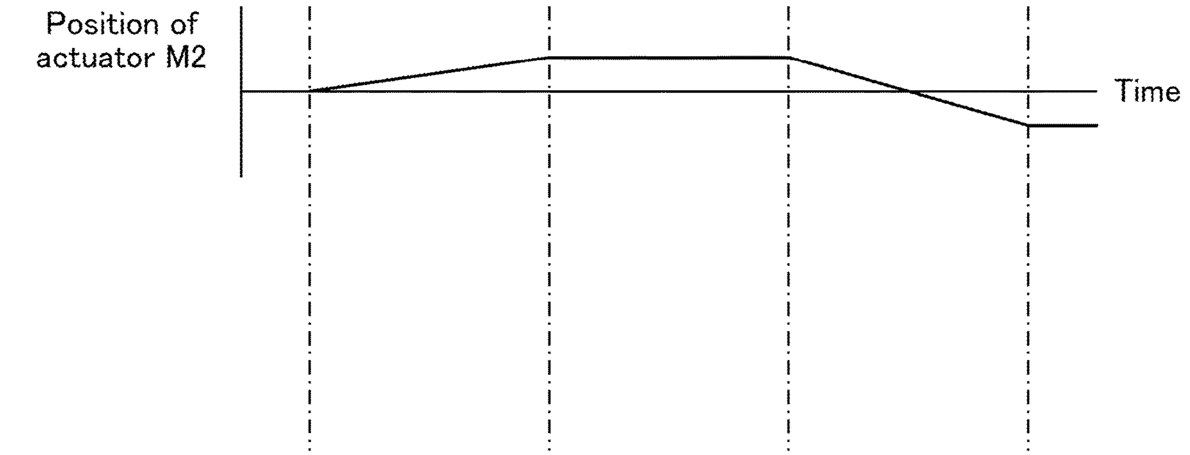

FIG. 3B shows changes in the position of the actuator M1 according to the amount of driving of the actuator M1. FIG. 3C shows changes in the position of the actuator M2 according to the amount of driving of the actuator M2. In the first and second burst periods, the optical system provided in the optical paths of the pre-pulse laser beam 31*p* and the main pulse laser beam 31*m* may absorb energy of the pre-pulse laser beam 31*p* and the main pulse laser beam 31*m* and be deformed due to thermal expansion. The EUV light generation controller 5 may control the actuators M1 and M2 based on the results of the detection of the main pulse laser beam 31*m* by the sensor 413. This may compensate for deformation of the optical system due to a thermal load.

FIGS. 3A to 3E do not show control of the actuators P1 and P2. The control of the actuators P1 and P2 may be substantially the same as the control of the actuators M1 and M2. However, the control oaf the actuators P1 and P2 may be based on the results of the detection of the pre-pulse laser beam 31*p*. The main pulse laser beam 31*m* may have a higher energy than the pre-pulse laser beam 31*p* and thus may apply a large thermal load to the optical system. The amount of driving of the actuators M1 and M2 may be larger than the amount of driving of the actuators P1 and P2.

In each of the first and second burst periods, the thermal load applied to the optical system may be gradually accumulated. As shown in the first burst period in FIGS. 3B and 3C, for example, the amount of driving of the actuators M1 and M2 may be larger at the end of the burst period than at the start of the burst period.

Figure 3D:
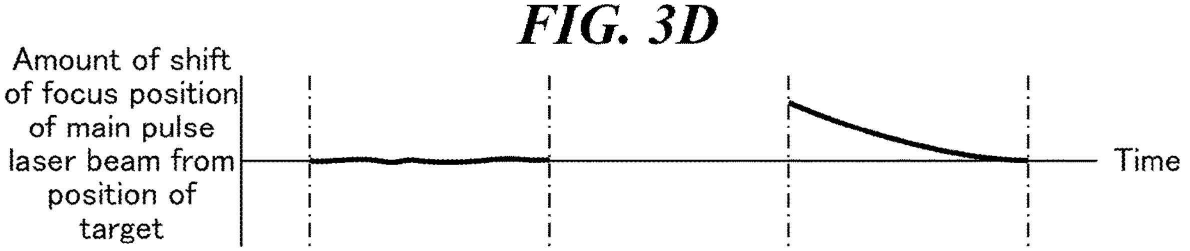

FIG. 3D shows changes of the amount of shift of the focus position of the main pulse laser beam 31*m* from the position of the target 27. Control of the actuators P1, P2, M1, and M2 as described above may achieve keeping the optical path axes of the pre-pulse laser beam 31*p* and the main pulse laser beam 31*m* in a desired range. As shown in FIG. 3D for the first burst period, for example, the shift of the focus position of the main pulse laser beam 31*m* from the position of the target 27 may be suppressed. Substantially the same control may be possible for the pre-pulse laser beam 31*p*.

Figure 3E:
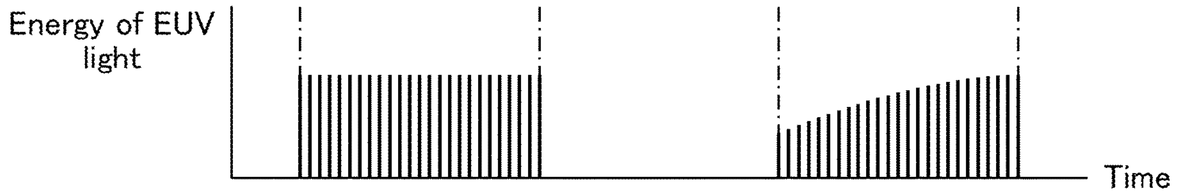

FIG. 3E shows changes in the energy of the EUV light. As shown for the first burst period, for example, control of the actuators P1, P2, M1, and M2 described above may achieve stabilizing the energy of the EUV light.

In the suspending period in which the command to output EUV burst shown in FIG. 3A is OFF, the pre-pulse laser beam 31*p* or the main pulse laser beam 31*m* is not outputted. The deformation of the optical system due to the thermal load may thus be restored.

However, in the suspending period, the pre-pulse laser beam 31*p* or the main pulse laser beam 31*m* is not outputted. This may not allow the sensor 413 to detect the laser beams. Thus, in the suspending period, feedback control of the actuators P1, P2, M1, and M2 may not be possible.

In that case, as shown in the suspending period in FIGS. 3B and 3C, the amount of driving of the actuators M1 and M2 may hardly change, being kept substantially constant. The amount of driving of the actuators M1 and M2 in the suspending period may be kept substantially unchanged from the amount of driving at the end of the first burst period. The same may be applied to the actuators P1 and P2.

After the suspending period, the command to output EUV burst shown in FIG. 3A may be turned ON. In other words, the second burst period may start. Even if the deformation of the optical system due to the thermal load is restored by the start of the second burst period, the control of the actuators M1 and M2 may start from the position where the deformation of the optical system due to the thermal load is not restored, as shown in FIGS. 3B and 3C. Accordingly, at the start of the second burst period, the focus position of the main pulse laser beam 31*m* may have shifted from the position of the target 27 as shown in FIG. 3D. The same may be applied to the pre-pulse laser beam 31*p*. Thus, as shown in FIG. 3E, the desired energy of the EUV light may not be achieved at the start of the second burst period.

In the embodiments described below, using a first guide laser beam that coincides with the optical path of the pre-pulse laser beam and a second guide laser beam that coincides with the optical path of the main pulse laser beam may enable control of the optical system in the suspending period.

3. EUV Light Generating Apparatus Including Guide Laser

3.1 Configuration

Figure 4:
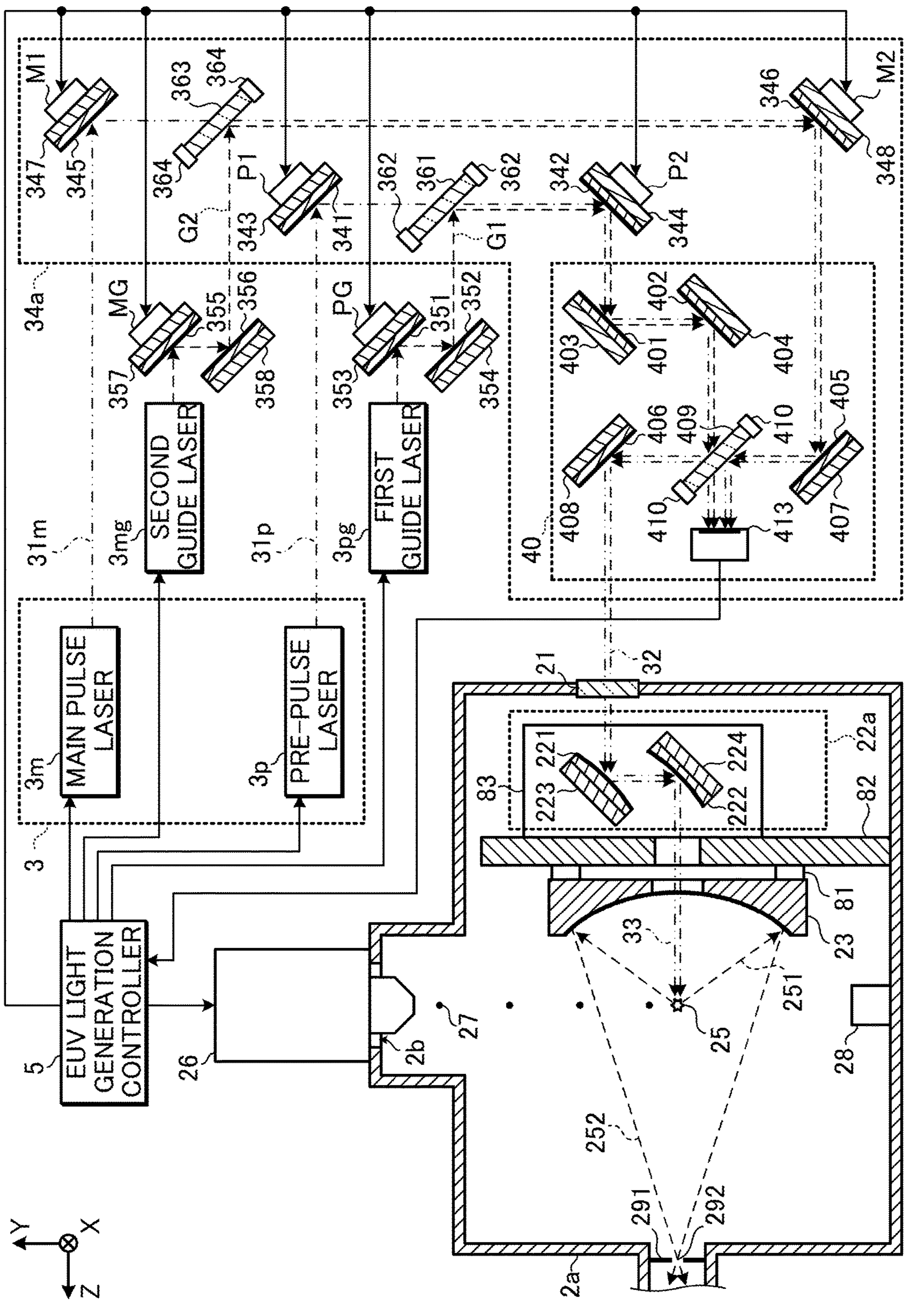
FIG. 4 schematically shows a configuration of an EUV light generating system according to a first embodiment of the present disclosure.

FIG. 4 schematically shows a configuration of an EUV light generating system according to a first embodiment of the present disclosure. In the first embodiment, the EUV light generating system may include a first guide laser 3*pg* and a second guide laser 3*mg*. The first guide laser 3*pg* may output the first guide laser beam G1. The second guide laser 3*mg* may output the second guide laser beam G2. The first guide laser beam G1 may have lower energy than any one of the pre-pulse laser beam 31*p* and the main pulse laser beam 31*m*. The second guide laser beam G2 may have lower energy than any one of the pre-pulse laser beam 31*p* and the main pulse laser beam 31*m*.

High-reflective mirrors 351 and 352 and abeam combiner 361 may be provided at an optical path of the first guide laser beam G1. The beam combiner 361 may be provided between the high-reflective mirrors 341 and 342 in the optical path of the pre-pulse laser beam 31*p*. The high-reflective mirror 351 may be held by a holder 353. The high-reflective mirror 352 may be held by a holder 354. The beam combiner 361 may be held by a holder 362. The holder 353 may be equipped with an actuator PG. The actuator P1 may correspond to a first actuator in the present disclosure. The actuator PG may correspond to a second actuator in the present disclosure. The actuator P2 may correspond to a third actuator in the present disclosure.

The high-reflective mirrors 351 and 352 may reflect, in this order, the first guide laser beam G1. The beam combiner 361 may transmit the pre-pulse laser beam 31*p* at a high transmittance and reflect the first guide laser beam G1 at a high reflectance. The beam combiner 361 may allow the central axes of the optical paths of the pre-pulse laser beam 31*p* and the first guide laser beam G1 to substantially coincide with each other.

High-reflective mirrors 355 and 356 and a beam combiner 363 may be provided in an optical path of the second guide laser beam G2. The beam combiner 363 may be provided between the high-reflective mirrors 345 and 346 in the optical path of the main pulse laser beam 31*m*. The high-reflective mirror 355 may be held by a holder 357. The high-reflective mirror 356 may be held by a holder 358. The beam combiner 363 may be held by a holder 364. The holder 357 may be equipped with an actuator MG. The actuator M1 may correspond to a fourth actuator in the present disclosure. The actuator MG may correspond to a fifth actuator in the present disclosure. The actuator M2 may correspond to a sixth actuator in the present disclosure.

The high-reflective mirrors 355 and 356 may reflect, in this order, the second guide laser beam G2. The beam combiner 363 may transmit the main pulse laser beam 31*m* at a high transmittance and reflect the second guide laser beam G2 at a high reflectance. The beam combiner 363 may allow the central axes of the optical paths of the main pulse laser beam 31*m* and the second guide laser beam G2 to substantially coincide with each other.

The beam combiner 409 included in the beam combiner module 40 may transmit the first guide laser beam G1 at a high transmittance. The beam combiner 409 may reflect the second guide laser beam G2 at a high reflectance. The sensor 413 may detect the first and second guide laser beams G1 and G2.

In other aspects, the first embodiment may have substantially the same configuration as the comparative example described with reference to FIG. 2.

3.2 Operation

The first and second guide laser beams G1 and G2 may be incident on the sensor 413. The sensor 413 may detect the first and second guide laser beams G1 and G2 and output the results of the detection to the EUV light generation controller 5. The EUV light generation controller 5 may calculate the beam position and the pointing of the first guide laser beams. G1 based on the output from the sensor 413. The EUV light generation controller 5 may calculate the beam position and the pointing of the second guide laser beam G2 based on the output from the sensor 413. As described below, the EUV light generation controller 5 may control, in the suspending period, the actuators for the high-reflective mirrors based on the beam position and the pointing of the first guide laser beam G1 and those of the second guide laser beam G2.

Figure 5:
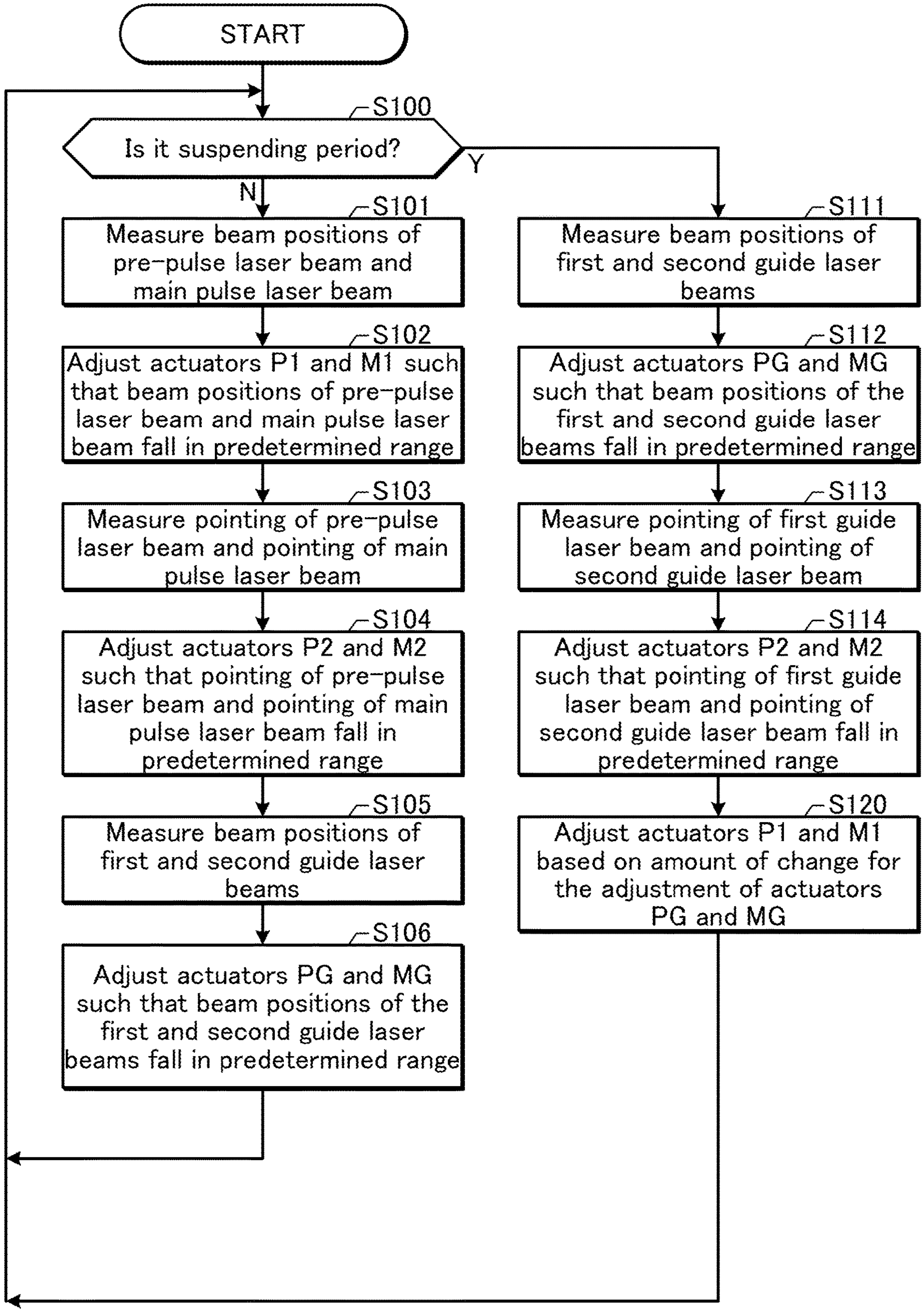
FIG. 5 is a flowchart showing a process of adjustment of optical path axes in the first embodiment.

FIG. 5 is a flowchart showing a process of the adjustment of the optical path axes in the first embodiment. In the following process, the EUV light generation controller 5 may perform the adjustment of the optical path axes in the suspending period and the adjustment of the optical path axes in the burst period.

At S100, the EUV light generation controller 5 may determine whether it is the burst period or the suspending period. For example, if the command to output EUV burst received from the exposure apparatus 6 is ON, the EUV light generation controller 5 may determine that it is the burst period. If the command to output EUV burst received from the exposure apparatus 6 is OFF, the EUV light generation controller 5 may determine that it is the suspending period.

A description is made below for the case where it is determined at S100 that it is the burst period. If it is the burst period (S100: NO), the EUV light generation controller 5 may proceed to S101. In the burst period, the pre-pulse laser beam 31*p*, the main pulse laser beam 31*m*, the first guide laser beam G1, and the second guide laser beam G2 may be outputted from the corresponding laser.

At S101, the EUV light generation controller 5 may receive the output from the sensor 413 and measure the beam positions of the pre-pulse laser beam 31*p* and the main pulse laser beam 31*m*.

Next, at S102, the EUV light generation controller 5 may adjust the actuator P1 such that the beam position of the pre-pulse laser beam 31*p* falls in a predetermined range. The EUV light generation controller 5 may adjust the actuator M1 such that the beam position of the main pulse laser beam 31*m* falls in a predetermined range.

Next, at S103, the EUV light generation controller 5 may receive the output from the sensor 413 again and measure the pointing of the pre-pulse laser beam 31*p* and the pointing of the main pulse laser beam 31*m*.

Next, at S104, the EUV light generation controller 5 may adjust the actuator P2 such that the pointing of the pre-pulse laser beam 31*p* falls in a predetermined range. The EUV light generation controller 5 may adjust the actuator M2 such that the pointing of the main pulse laser beam 31*m* falls in a predetermined range.

Adjustment of the optical path axes of the pre-pulse laser beam 31*p* and the main pulse laser beam 31*m* as described above may allow the target 27 to be appropriately irradiated with the laser beams.

Next S104, at S105, the EUV light generation controller 5 may receive the output from the sensor 413 again and measure the beam positions of the first and second guide laser beams G1 and G2.

Next, at S106, the EUV light generation controller 5 may adjust the actuator PG such that the beam position of the first guide laser beam G1 falls in a predetermined range. The EUV light generation controller 5 may adjust the actuator MG such that the beam position of the second guide laser beam G2 falls in a predetermined range.

After S106, the EUV light generation controller 5 may return to S100.

A description is made below for the other case where it is determined at S100 that it is the suspending period. If it is the suspending period (S100: YES), the EUV light generation controller 5 may proceed to S111. In the suspending period, the pre-pulse laser beam 31*p* or the main pulse laser beam 31*m* may not be outputted. The first and second guide laser beams G1 and G2 may be outputted from the corresponding guide laser.

At S111, the EUV light generation controller 5 may receive the output from the sensor 413 and measure the beam positions of the first and second guide laser beams G1 and G2.

Next, at S112, the EUV light generation controller 5 may adjust the actuator PG such that the beam position of the first guide laser beam G1 falls in a predetermined range. The EUV light generation controller 5 may adjust the actuator MG such that the beam position of the second guide laser beam G2 falls in a predetermined range.

Here, the EUV light generation controller 5 may store the amount of change for the adjustment of the actuator PG and the amount of change for the adjustment of the actuator MG to a storage device. The storage device may be a memory 1002 described below.

Next, at S113, the EUV light generation controller 5 may receive the output from the sensor 413 again and measure the pointing of the first guide laser beam G1 and the pointing of the second guide laser beam G2.

Next, at S114, the EUV light generation controller 5 may adjust the actuator P2 such that the pointing of the first guide laser beam G1 falls in a predetermined range. The EUV light generation controller 5 may adjust the actuator M2 such that the pointing of the second guide laser beam G2 falls in a predetermined range.

In S111 to S114, the optical path axes of the first and second guide laser beams G1 and G2, instead of the pre-pulse laser beam 31*p* and the main pulse laser beam 31*m*, may be adjusted.

According to S111 to S114, even in the suspending period where the pre-pulse laser beam 31*p* is outputted, the actuator P2 may be adjusted based on the results of the detection of the first guide laser beam G1.

According to S111 to S114, even in the suspending period where the main pulse laser beam 31*m* is not outputted, the actuator M2 may be adjusted based on the results of the detection of the second guide laser beam G2.

Next to S114, at S120, the EUV light generation controller 5 may adjust the actuator P1 based on the amount of change for the adjustment of the actuator PG. The amount of change for the adjustment of the actuator PG may be read from the storage device. The amount of change for the adjustment of the actuator P1 may be the same as the amount of change for the adjustment of the actuator PG. Alternatively, the amount of change for the adjustment of the actuator P1 may be obtained by multiplying the amount of change for the adjustment of the actuator PG by a constant of proportionality. The constant of proportionality may be obtained based on the ratio of the optical path length of the pre-pulse laser beam 31*p* from the high-reflective mirror 341 to the sensor 413 to the optical path length of the first guide laser beam G1 from the high-reflective mirror 351 to the sensor 413.

At S120, the EUV light generation controller 5 may adjust the actuator M1 based on the amount of change for the adjustment of the actuator MG. The amount of change for the adjustment of the actuator MG may be read from the storage device. The amount of change for the adjustment of the actuator M1 may be the same as the amount of change for the adjustment of the actuator MG. Alternatively, the amount of change for the adjustment of the actuator M1 may be obtained by multiplying the amount of change for the adjustment of the actuator MG by a constant of proportionality. The constant of proportionality may be obtained based on the ratio of the optical path length of the main pulse laser beam 31*m* from the high-reflective mirror 345 to the sensor 413 to the optical path length of the second guide laser beam G2 from the high-reflective mirror 355 to the sensor 413.

According to S120, even in the suspending period where the pre-pulse laser beam 31*p* is not outputted, the actuator P1 may be adjusted based on the amount of change for the adjustment of the actuator PG.

According to S120, even in the suspending period where the main pulse laser beam 31*m* is not outputted, the actuator M1 may be adjusted based on the amount of change for the adjustment of the actuator MG.

After S120, the EUV light generation controller 5 may return to S100.

3.3 Effect

FIGS. 6A to 6F show the relationship between the control of the actuators and the stability in the energy of the EUV light in the EUV light generating system shown in FIG. 4. In FIGS. 6A to 6F, a graph showing the change in the position of the actuator MG is added to graphs corresponding to those shown in FIGS. 3A to 3E.

Figure 6A:
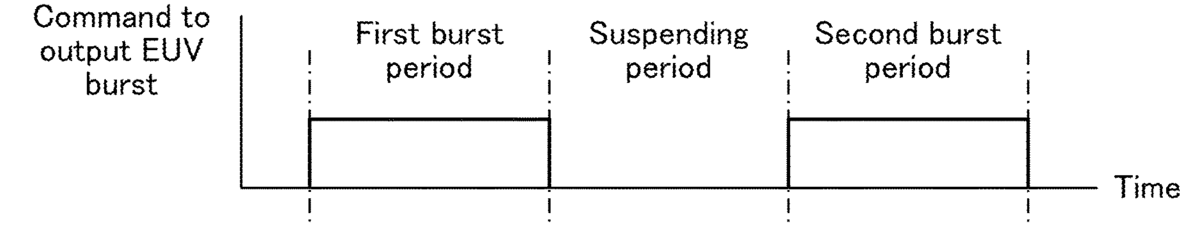
FIGS. 6A to 6F show a relationship between control of actuators and stability in the energy of EUV light in the EUV light generating system shown in FIG. 4.
Figure 6B:
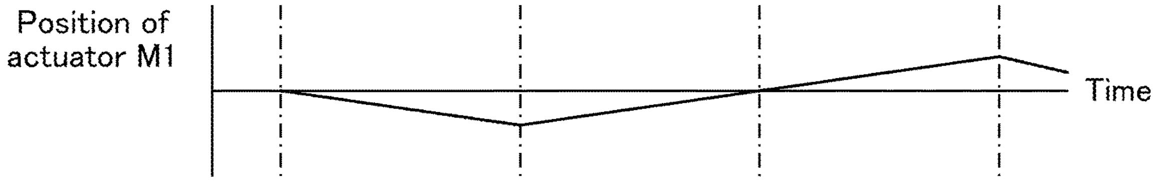

As shown in FIGS. 6A to 6C, 6E, and 6F, the operation in the first burst period may be substantially the same as that shown in FIGS. 3A to 3E. In the first burst period, the actuator MG may additionally be controlled as shown in FIG. 6D. The actuator MG may be controlled based on the results of the detection of the second guide laser beam G2. Similarly to the control of the actuator MG, control of the actuator PG may be performed based on the results of the detection of the first guide laser beam G1, although it is not shown in FIGS. 6A to 6F.

In the suspending period after the first burst period, the pre-pulse laser beam 31*p* or the main pulse laser beam 31*m* is not be outputted. The deformation of the optical system due to the thermal load may thus be restored.

Figure 6C:
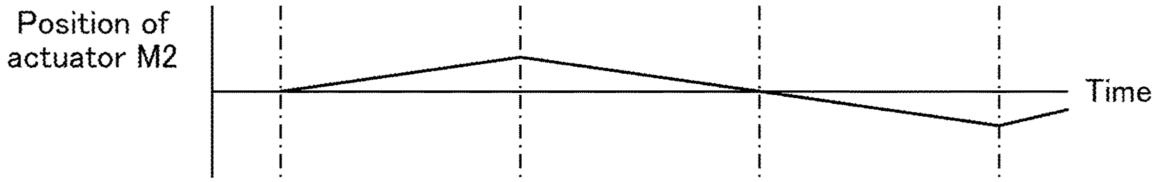
Figure 6D:
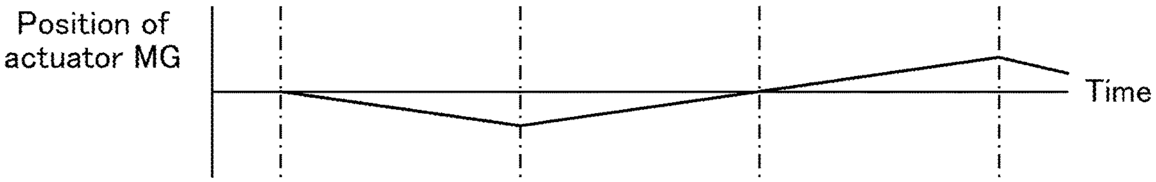

In the suspending period, as shown in FIGS. 6C and 6D, both of the actuators MG and M2 may be controlled based on the results of the detection of the second guide laser beam G2. The actuator M2 may thus be controlled as the deformation of the optical system due to the thermal load is restored. Namely, the control based on the results of the detection of the second guide laser beam G2 may allow the control based on the results of the detection of the main pulse laser beam 31*m* to be unnecessary.

In the suspending period, as shown in FIG. 6B, the actuator M1 may be controlled based on the amount of driving of the actuator MG. The actuator M1 may thus be controlled as the deformation of the optical system due to the thermal load is restored. Namely, the control based on the amount of driving of the actuator MG may allow the control based on the results of the detection of the main pulse laser beam 31*m* to be unnecessary.

Before the start of the second burst period next to the suspending period, as shown in FIGS. 6B to 6D, the positions of the actuators M1 and M2 as well as the position of the actuator MG may be adjusted as the deformation of the optical system due to the thermal load is restored. Accordingly, in the second burst period, the control may be started from appropriate positions of the actuators. The same may be applied to the actuators PG, P1, and P2.

Figure 6E:
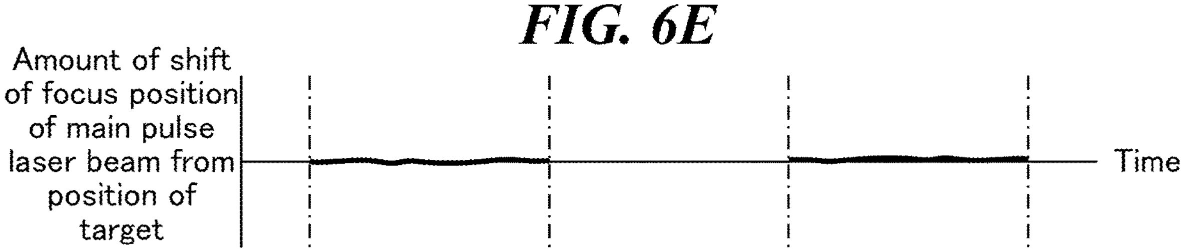

Accordingly, as shown in FIG. 6E, the shift in the focus position of the main pulse laser beam 31*m* from the position of the target 27 at the start of the second burst period may be suppressed. The same may be applied to the pre-pulse laser beam 31*p*.

Figure 6F:
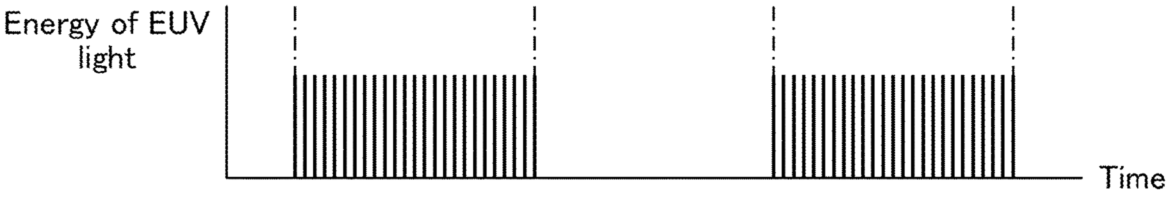

As shown in FIG. 6F, a desired energy of the EUV light may be obtained at the start of the second burst period.

4. EUV Light Generating Apparatus That Detects Light Reflected by Target

4.1 Configuration

Figure 7:
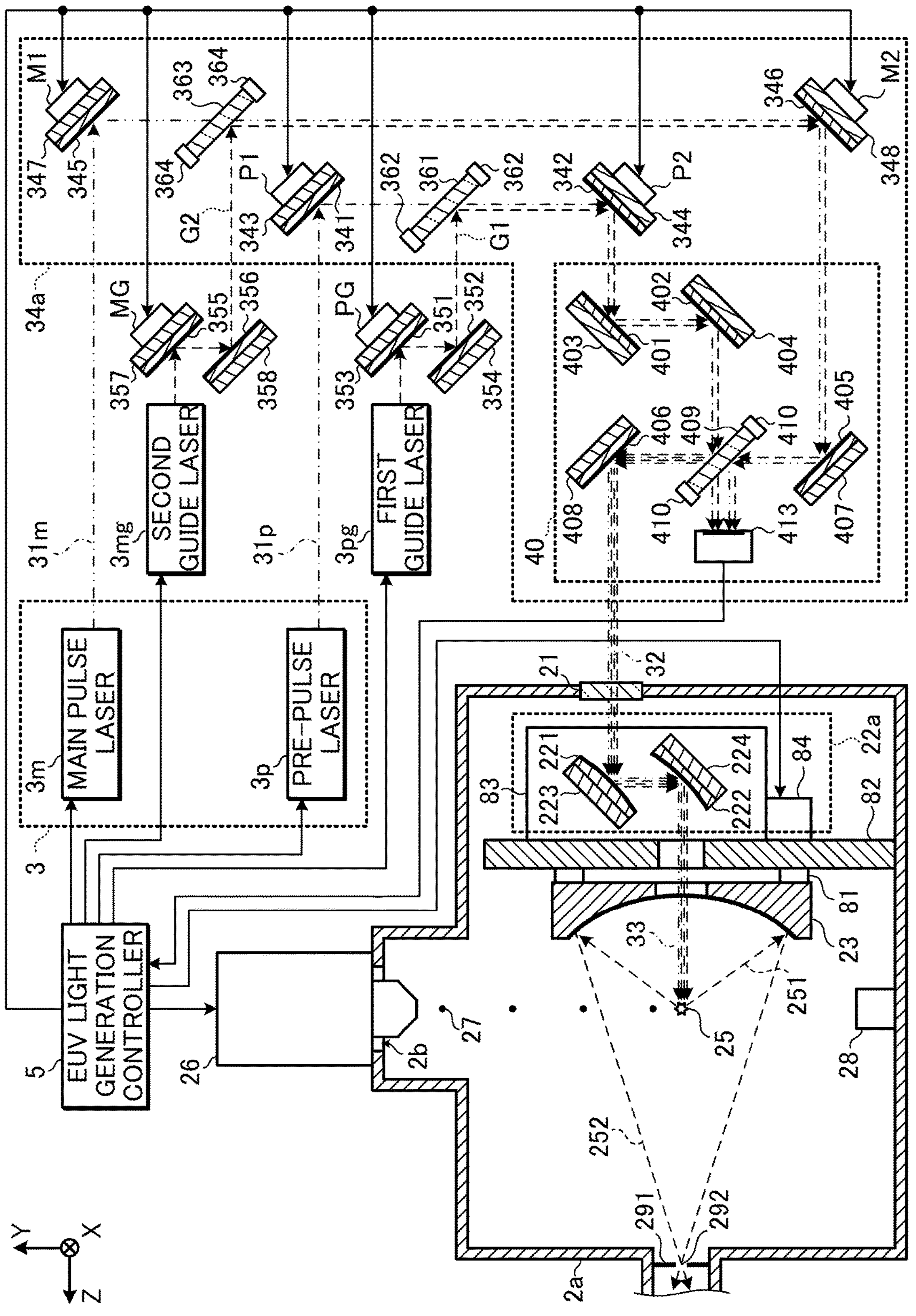
FIG. 7 schematically shows a configuration of an EUV light generating system according to a second embodiment of the present disclosure.
Figure 8:
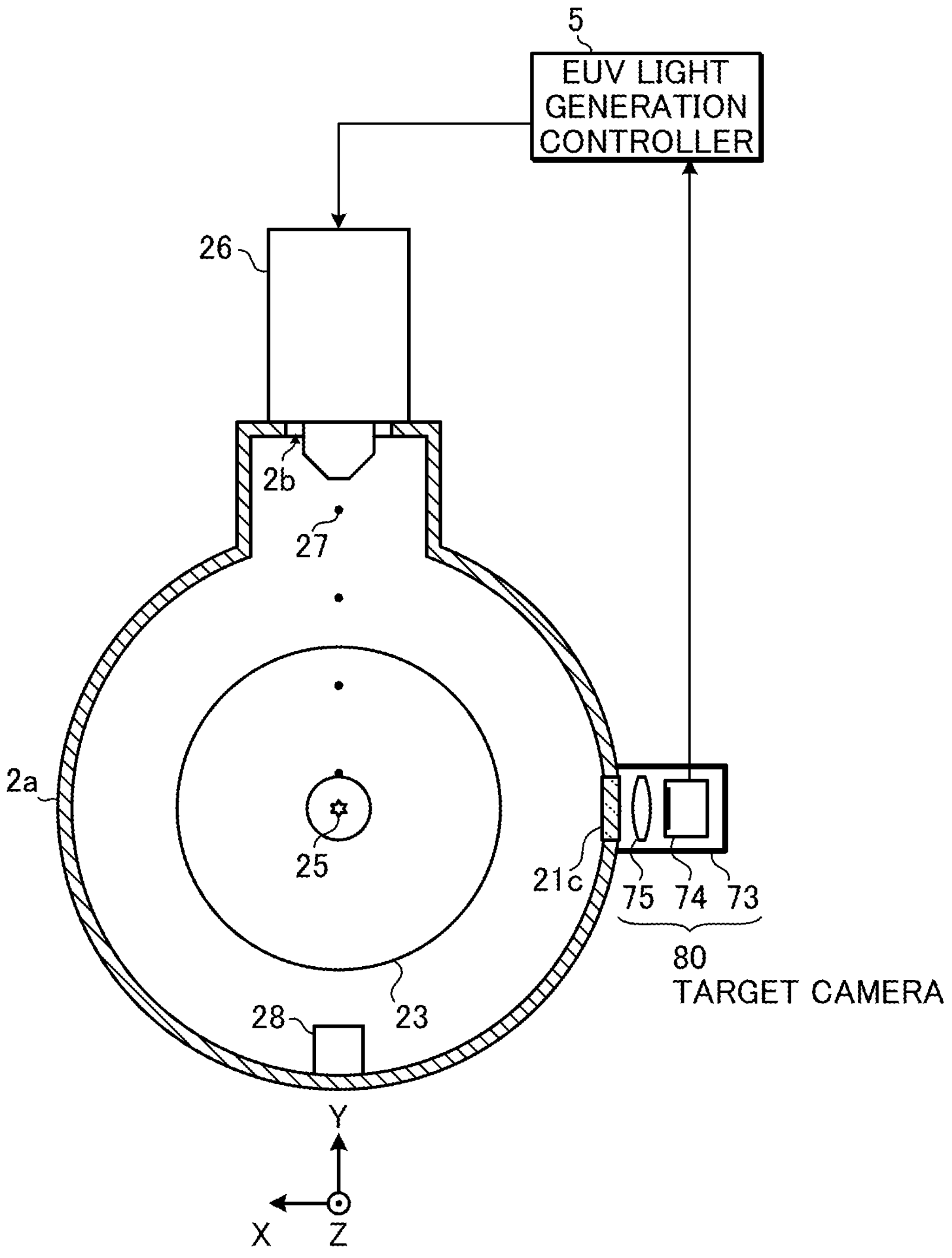
FIG. 8 also schematically shows the configuration of the EUV light generating system according to the second embodiment of the present disclosure.

FIGS. 7 and 8 schematically show a configuration of an EUV light generating system according to a second embodiment of the present disclosure. FIG. 7 shows the EUV light generating system as viewed in the X direction. FIG. 8 shows the EUV light generating system as viewed in the −Z direction.

In the second embodiment, the beam combiner 409 may transmit a part of the first guide laser beam G1 to the sensor 413 and reflect another part of the first guide laser beam G1 to the high-reflective mirror 406. The beam combiner 409 may reflect a part of the second guide laser beam G2 to the sensor 413 and transmit another part of the second guide laser beam G2 to the high-reflective mirror 406. Namely, the beam combiner module 40 may allow the first and second guide laser beams G1 and G2 as well as the pre-pulse laser beam 31*p* and the main pulse laser beam 31*m* to enter the chamber 2*a*.

In the second embodiment, an actuator 84 for the laser beam focusing optical system may be provided in the chamber 2*a*. The actuator 84 for the laser beam focusing optical system may be capable of moving the plate 83 relatively to the position of the plate 82. The actuator 84 for the laser beam focusing optical system may be controlled by the EUV light generation controller 5. The position of the laser beam focusing optical system 22*a* may thus be changed. Changing the position of the laser beam focusing optical system 22*a* may allow the optical paths of the pulse laser beam 33, including the pre-pulse laser beam 31*p* and the main pulse laser beam 31*m*, and the optical paths of the first and second guide laser beams G1 and G2 to be changed.

As shown in FIG. 8, in the second embodiment, a target camera 80 may be provided on the chamber 2*a*. A window 21*c* may be provided in the wall of the chamber 2*a* at the position on which the target camera 80 is mounted. The target camera 80 may include an image sensor 74, a transfer optical system 75, and a housing 73. The image sensor 74 and the transfer optical system 75 may be accommodated in the housing 73. An unillustrated high-speed shutter may also be accommodated in the housing 73. An unillustrated light source may also be provided in the chamber 2*a* to enable photographing of the target 27. The transfer optical system 75 may form an image of an object positioned in the plasma generation region 25 on the light receiving surface of the image sensor 74.

In other aspects, the second embodiment may have substantially the same configuration as the first embodiment described with reference to FIG. 4.

4.2 Principle of Detecting Optical Path Axis of Laser Beam Based on Reflected Light The droplet-shaped target 27 moving from the target supply unit 26 toward the plasma generation region 25 may have a substantially spherical form. A guide laser beam incident on a portion of the droplet-shaped target 27 may be reflected by the spherical surface of the target 27 to multiple directions. The image of the target 27 including the reflected light may be observed by the target camera 80. The position of the portion of the target 27 irradiated with the guide laser beam may be estimated by the following principle.

Figure 9A:
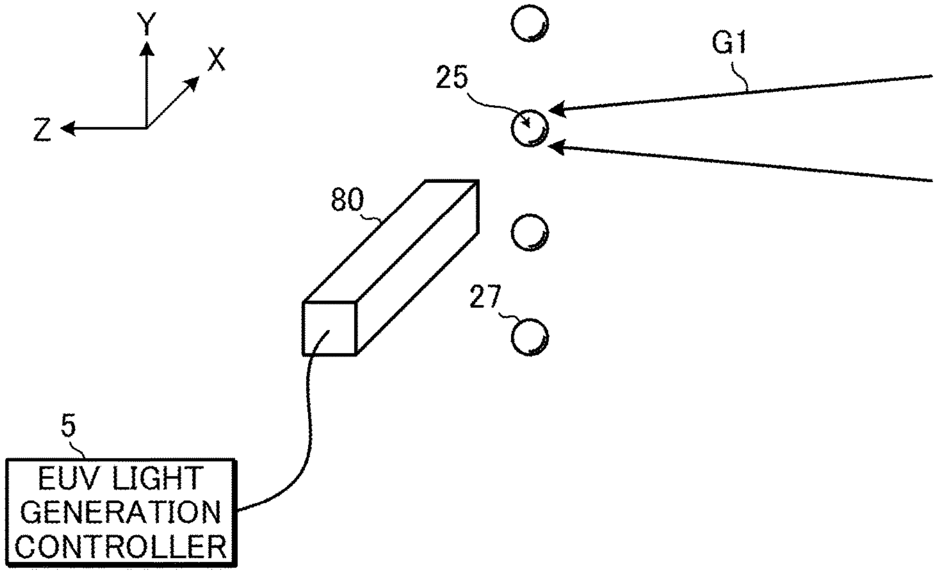
FIG. 9A shows an arrangement of a target camera 80 in relation to a trajectory of a target 27.

FIG. 9A shows an arrangement of the target camera 80 in relation to a trajectory of the target 27. The target 27 may move in the −Y direction along a trajectory parallel to the Y-axis toward the plasma generation region 25. The target 27 that has reached the plasma generation region 25 may be irradiated with the first guide laser beam G1 in the Z direction. The target camera 80 may be arranged to photograph an object in the plasma generation region 25 in a direction substantially perpendicular to the optical path axis of the first guide laser beam G1. Here, the target camera 80 photographs an object in the plasma generation region 25 in the X direction. However, the present disclosure is not limited to this. Further, the following description is made in the case where the target 27 is irradiated with the first guide laser beam G1. However, the same may be applied to the case where the target 27 is irradiated with the second guide laser beam G2.

Figure 9B:
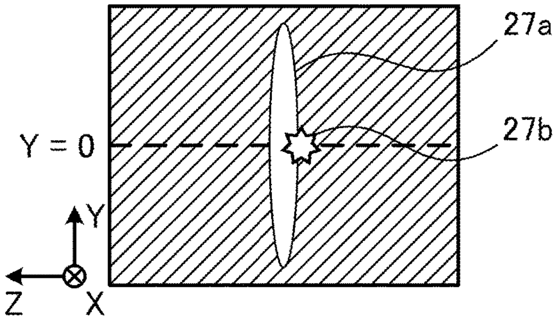
FIG. 9B shows an example of an image photographed by the target camera 80 in the case where an optical path axis of a guide laser beam G1 is adjusted to an ideal position.

FIG. 9B shows an example of an image photographed by the target camera 80 in the case where the optical path axis of the guide laser beam G1 is adjusted at an ideal position. The ideal position of the optical path axis of the guide laser beam G1 may be at Y=0. The transfer optical system 75 may form an inverted image of the target 27 on the light receiving surface of the image sensor 74 of the target camera 80. However, FIG. 9B, and FIGS. 9C and 9D described below, may each show an erect image converted from the inverted image.

If the unillustrated light source is turned ON in the chamber 2*a*, the image photographed by the target camera 80 may include an image 27*a* of the target 27 stretched in the Y direction. The length of the image 27*a* in the Y direction may depend on the exposure time of the target camera 80 and the speed of the target 27. If the unillustrated light source is not turned ON or such Eight source is not provided in the chamber 2*a*, the image 27*a* may not be captured.

The guide laser beam G1 may be incident on the surface of the target 27 facing in the −Z direction. The guide laser beam G1 may be reflected by the spherical surface of the target 27 in multiple directions. A part of the reflected light may reach the target camera 80. The image photographed by the target camera 80 may include a bright image 27*b* corresponding to the position of the portion of the target 27 irradiated with the guide laser beam G1. When the optical path axis of the guide laser beam. G1 is in the ideal position on Y=0, the image 27*b* may be formed at the position corresponding to Y=0.

Figure 9C:
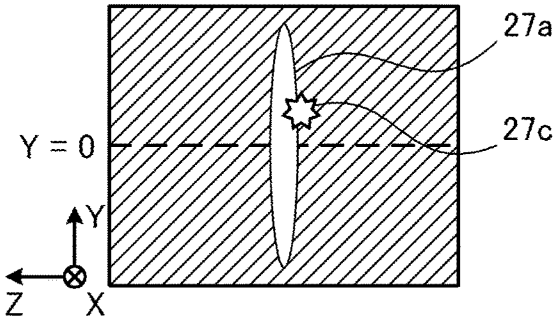
FIG. 9C shows an example of an image photographed by the target camera 80 in the case where the optical path axis of the guide laser beam G1 is shifted in a Y direction from the ideal position.

FIG. 9C shows an example of an image photographed by the target camera 80 in the case where the optical path axis of the guide laser beam G1 is shifted in the Y direction from the ideal position. If the optical path axis of the guide laser beam G1 is shifted in the Y direction, a major part of the guide laser beam G1 may be incident on the surface of the target 27 facing in the Y direction. The image photographed by the target camera 80 may thus include a bright image 27*c* at a position shifted in the Y direction from Y=0.

In contrast, if the optical path axis of the guide laser beam G1 is shifted in the −Y direction from the ideal position, the image photographed by the target camera 80 may include a bright image 27*c* at a position shifted in the −Y direction from Y=0. Thus, the position in the Y direction where the image 27*c* is formed may be detected. Based on the results of the detection, the amount of shift of the optical path axis of the guide laser beam G1 in the Y direction or the −Y direction may be calculated. The position of the guide laser beam G1 in a direction intersecting a photographing direction of the target era 80 may thus be estimated based on the position of the image 27*c*.

Figure 9D:
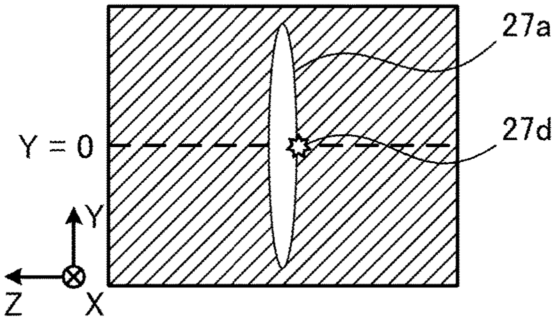
FIG. 9D shows an example of an image photographed by the target camera 80 in the case where the optical path axis of the guide laser beam G1 is shifted in an X direction from the ideal position.

FIG. 9D shows an example of an image photographed by the target camera 80 in the case where the optical path axis of the guide laser beam G1 is shifted in the X direction from the ideal position. If the optical path axis of the guide laser beam G1 is shifted in the X direction, a major part of the guide laser beam G1 may be incident on the surface of the target 27 facing in the X direction that is not seen from the target camera 80. Accordingly, the major part of the guide laser beam G1 reflected by the surface of the target 27 may not reach the target camera 80. The image photographed by the target camera 80 may thus include an image 27*d* darker or smaller than the image 27*b* shown in FIG. 9B.

In contrast, if the optical path axis of the guide laser beam G1 is shifted in the −X direction from the ideal position, a major part of the guide laser beam G1 may be incident on the surface of the target 27 facing in the −X direction that is seen from the target camera 80. Accordingly, a major part of the guide laser beam G1 reflected by the surface of the target 27 may reach the target camera 80. The image photographed by the target camera 80 may thus include an image brighter or larger than the image 27*b* shown in FIG. 9B. Thus, the brightness or the size of the image 27*d* may be detected. Based on the results of the detection, the amount of shift of the optical path axis of the guide laser beam. G1 in the X direction may be calculated. The position of the guide laser beam G1 in a direction substantially parallel to the photographing direction of the target camera 80 may thus be estimated based on the brightness or the size of the image 27*d*.

Irradiating the target 27 with the pre-pulse laser beam 31*p* may cause the target 27 to expand or diffuse. Thus, the optical path axis of the pie-pulse laser beam 31*p* may not necessarily be detected by the same principle described above. Irradiating the target 27 with the main pulse laser beam 31*m* may cause the target 27 to be turned into plasma. Thus, the optical path axis of the main pulse laser beam 31*m* may not necessarily be detected by the same principle described above.

A description is made here in the case where a single target camera 80 is used. However, the present disclosure is not limited to this. A plurality of cameras may be provided to photograph the plasma generation region 25 in directions substantially perpendicular to the optical path axis of the guide laser beam.

4.3 Operation

Figure 10:
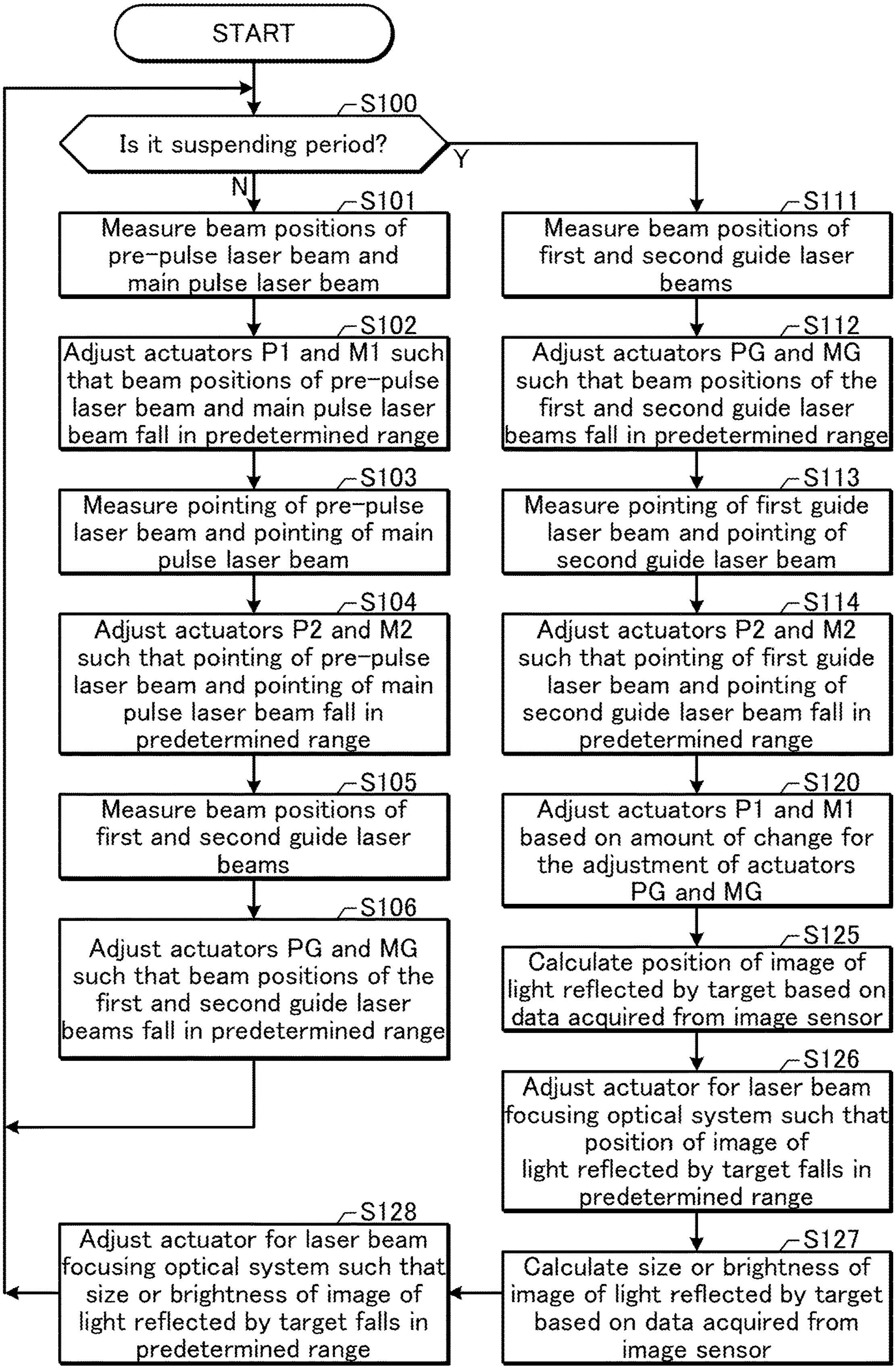
FIG. 10 is a flowchart showing a process of adjustment of optical path axes in the second embodiment.

FIG. 10 is a flowchart showing a process of adjustment of the optical path axes in the second embodiment. In the second embodiment, the process to determine whether it is the burst period or the suspending period and the process of adjustment of the optical path axes in the burst period may be substantially the same as S100 to S106 described with reference to FIG. 5.

In the second embodiment, the process of adjustment of the optical path axes in the suspending period at S111 to S120 may be substantially the same as described with reference to FIG. 5. The process in the suspending period in the second embodiment may be different from the first embodiment at the point that the following process is executed after S120.

At S125 after S120, the EUV light generation controller 5 may acquire an image data from the image sensor 74 of the target camera 80. The EUV light generation controller 5 may calculate the position of the image of the reflected light reflected by the target 27 based on the image data acquired from the image sensor 74. Based on the position of the image of the reflected light reflected by the target 27, the position of the guide laser beam in the Y direction may be estimated.

Next, at S126, the EUV light generation controller 5 may adjust the actuator 84 for the laser beam focusing optical system such that the position of the image of the reflected light reflected by the target 27 falls in a predetermined range. Namely, the EUV light generation controller 5 may adjust the actuator 84 for the laser beam focusing optical system such that the position of the guide laser beam in the Y direction falls in a desired range.

Next, at S127, the EUV light generation controller 5 may calculate the size of the image of the reflected light reflected by the target 27 based on the image data acquired from the image sensor 74. Based on the size of the image of the reflected light reflected by the target 27, the position of the guide laser beam in the X direction may be estimated. Alternatively to the size of the image of the reflected light, the brightness of the image of the reflected light may be calculated at S127. Based on the brightness of the image of the reflected light, the position of the guide laser beam in the X direction may be estimated.

Next, at S128, the EUV light generation controller 5 may adjust the actuator 84 for the laser beam focusing optical system such that the size or the brightness of the image of the reflected light reflected by the target 27 falls in a predetermined range. Namely, the EUV light generation controller 5 may adjust the actuator 84 for the laser beam focusing optical system such that the position of the guide laser beam in the X direction falls in a desired range.

In S125 to S128, if the position of the first guide laser beam G1 and the position of the second guide laser beam G2 are different from each other, an average of these positions may be used to adjust the actuator 84 for the laser beam focusing optical system. Alternatively, the position of the first guide laser beam G1 may be used to adjust the actuator 84 for the laser beam focusing optical system.

After S128, the EUV light generation controller 5 may return to S100.

4.4 Effect

According to the second embodiment, the actuator 84 for the laser beam focusing optical system may be adjusted based on the positions of the guide laser beams in the plasma generation region 25. This may improve the accuracy in the adjustment of the optical path axes of the laser beams.

Figure 11:
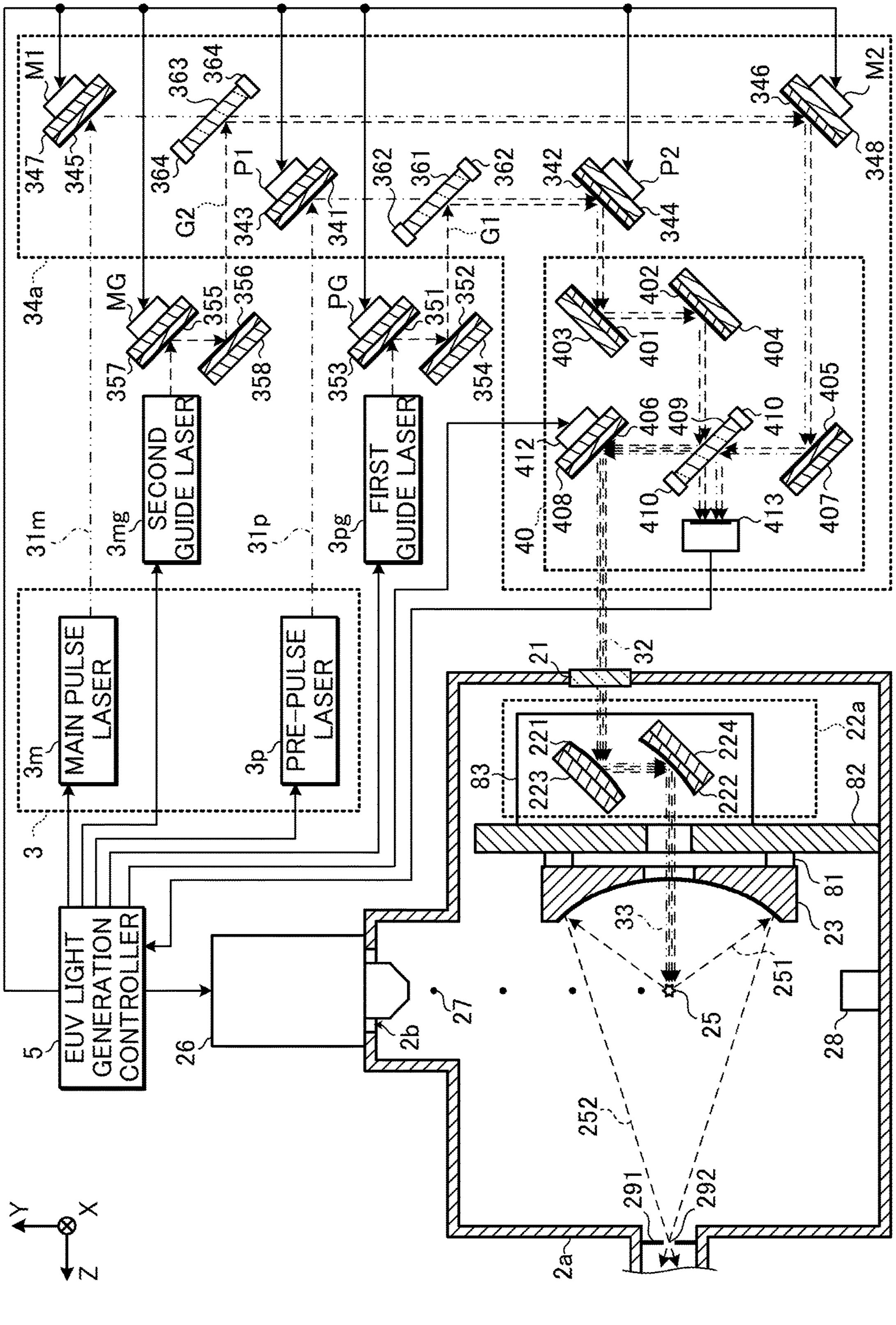
FIG. 11 schematically shows a configuration of an EUV light generating system according to a third embodiment of the present disclosure.

5. EUV Light Generating Apparatus Including Actuator with Improved Responsiveness FIG. 11 schematically shows a configuration of an EUV light generating system according to a third embodiment of the present disclosure. Instead of the actuator 84 for the laser beam focusing optical system described with reference to FIG. 7 to move the plate 83, an actuator 412 may be provided to move the holder 408 for the high-reflective mirror 406 in the third embodiment. The EUV light generation controller 5 may control the actuator 412 instead of controlling the actuator 84 for the laser beam focusing optical system.

In other aspects, the third embodiment may be substantially the same as the second embodiment described with reference to FIGS. 7 to 10.

The actuator 84 for the laser beam focusing optical system in the second embodiment may move the laser beam focusing optical system 22*a* including a plurality of mirrors, and move the plate 83 and an unillustrated cooling unit. It may thus be difficult to improve the response speed. However, in the third embodiment, the actuator 412 moves a single high-reflective mirror 406 and a holder 408. It is thus expected to improve the response speed.

In the third embodiment, the holder 408 for the high-reflective mirror 406 may be equipped with the actuator 412. However, the present disclosure is not limited to this. For example, the holder 404 for the high-reflective mirror 402 to reflect the pre-pulse laser beam 31*p* and the holder 407 for the high-reflective mirror 405 to reflect the main pulse laser beam 31*m* may each be equipped with an actuator. The holder 404 for the high-reflective mirror 402 to reflect the pre-pulse laser beam 31*p* may be unnecessary to be accompanied by a cooling unit. Accordingly, the actuator to move the holder 404 for the high-reflective mirror 402 may further improve the response speed.

6. EUV Light Generating Apparatus to Adjust Positions of Guide Laser Beam and Driver Laser Beam Simultaneously

6.1 Configuration

Figure 12:
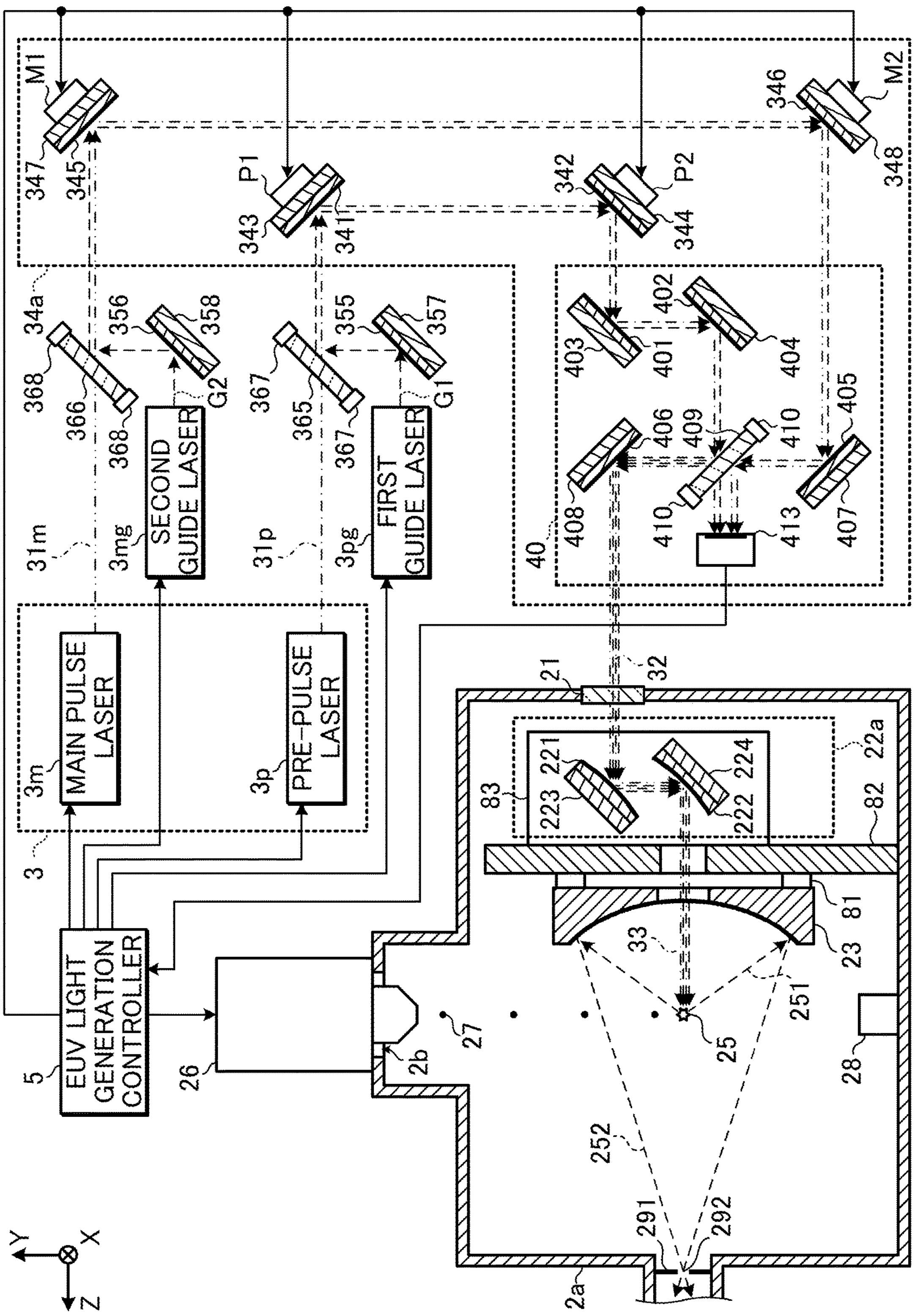
FIG. 12 schematically shows a configuration of an EUV light generating system according to a fourth embodiment of the present disclosure.

FIG. 12 schematically shows a configuration of an EUV light generating system according to a fourth embodiment of the present disclosure. The fourth embodiment may be different from the second or third embodiment at the point that the process (S120) of adjustment of the actuators P2 and M2 based on the amount of change for the adjustment of the actuators PG and MG is omitted.

As shown in FIG. 12, the EUV light generating system of the fourth embodiment may include high-reflective mirrors 355 and 356, beam combiners 365 and 366, and holders 357, 358, 367, and 368 to hold them. The high-reflective mirrors 351, 352, 355, and 356, the beam combiners 361 and 363, the holders 353, 354, 357, 358, 362, and 364, and the actuators PG and MG shown in FIGS. 7 and 11 may be omitted.

The high-reflective mirror 355 may be provided in the optical path of the first guide laser beam G1 outputted from the first guide laser 3*pg*. The beam combiner 365 may be provided in the optical path of the first guide laser beam G1 reflected by the high-reflective mirror 355. The beam combiner 365 may be provided in the optical path of the pre-pulse laser beam 31*p* between the pre-pulse laser 3*p* and the high-reflective mirror 341. The beam combiner 365 may transmit the pre-pulse laser beam 31*p* at a high transmittance and reflect the first guide laser beam G1 at a high reflectance. The beam combiner 365 may allow the central axes of the optical paths of the pre-pulse laser beam 31*p* and the first guide laser beam G1 to substantially coincide with each other.

The high-reflective mirror 356 may be provided in the optical path of the second guide laser beam. G2 outputted from the second guide laser 3*mg*. The beam combiner 366 may be provided in the optical path of the second guide laser beam G2 reflected by the high-reflective mirror 356. The beam combiner 366 may be provided in the optical path of the main pulse laser beam 31*m* between the main pulse laser 3*m* and the high-reflective mirror 345. The beam combiner 366 may transmit the main pulse laser beam 31*m* at a high transmittance and reflect the second guide laser beam G2 at a high reflectance. The beam combiner 366 may allow the central axes of the optical paths of the main pulse laser beam 31*m* and the second guide laser beam G2 to substantially coincide with each other.

According to the configuration described above, controlling the actuator P1 may cause the positions of the optical path axes of the first guide laser beam G1 and the pre-pulse laser beam 31*p* to move simultaneously. Controlling the actuator M1 may cause the positions of the optical path axes of the second guide laser beam G2 and the main pulse laser beam 31*m* to move simultaneously.

6.2 Operation

Figure 13:
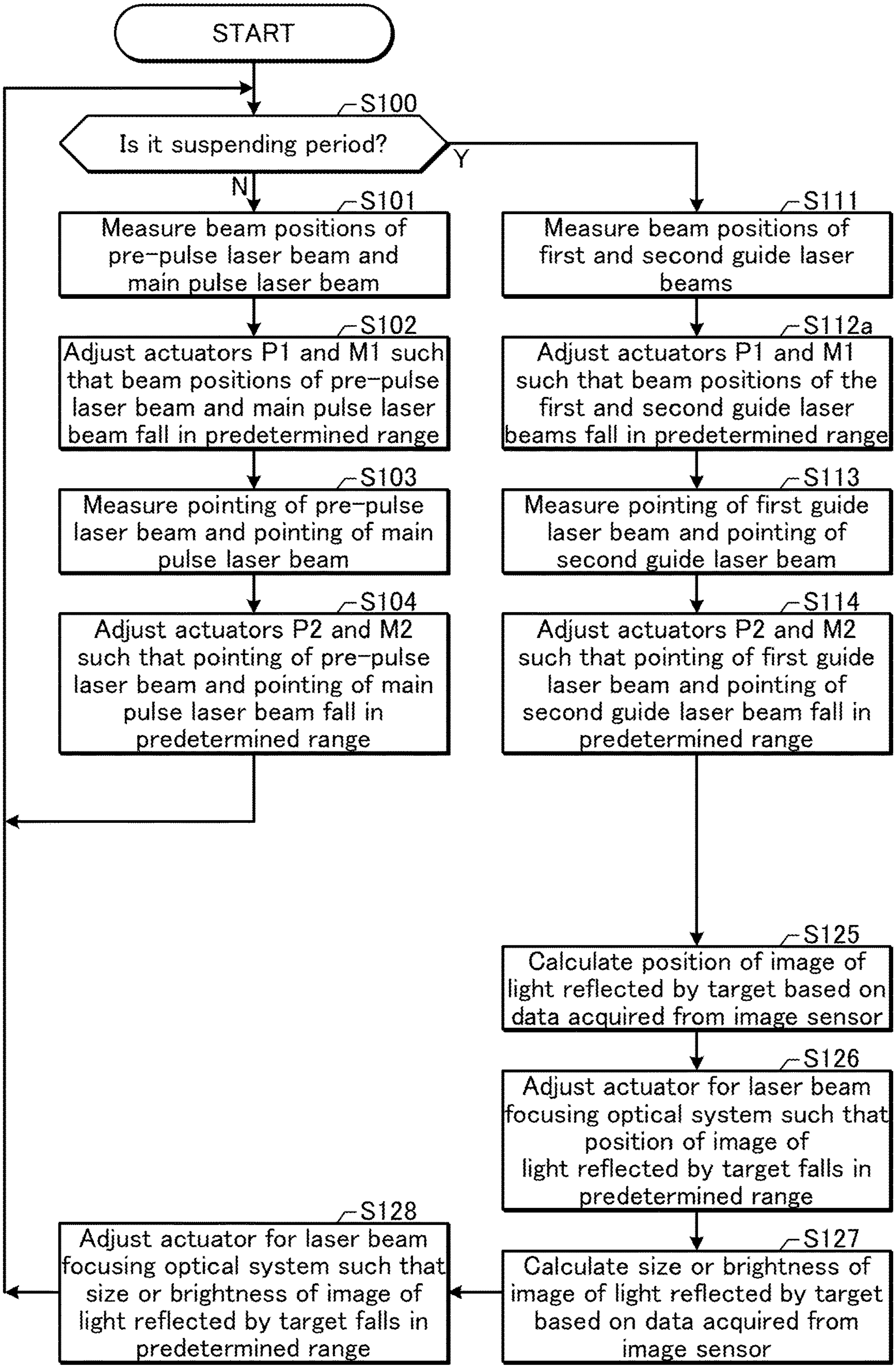
FIG. 13 is a flowchart showing a process of adjustment of optical path axes in the fourth embodiment.

FIG. 13 is a flowchart showing a process of adjustment of the optical path axes in the fourth embodiment. In the fourth embodiment, S105 and S106 (see FIG. 10) in the burst period may be omitted. Accordingly, in FIG. 13, the first and second guide lasers 3*pg* and 3*mg* may not necessarily output the guide laser beams in the burst period. However, this embodiment may not be limited to the case where the first and second guide lasers 3*pg* and 3*mg* are stopped in the burst period. The first and second guide lasers 3*pg* and 3*mg* may output the guide laser beams in the burst period to enable an evaluation as to whether the optical path axes of the driver laser beams and the guide laser beams coincide with each other.

Instead of S112 (see FIG. 10), S112*a* may be performed in the suspending period in the fourth embodiment. At S112*a*, the EUV light generation controller 5 may adjust the actuators P1 and M1 such that the beam positions of the first and second guide laser beams G1 and G2 are in the respective predetermined ranges. Accordingly, in the fourth embodiment, S120 (see FIG. 10) in the suspending period may be omitted.

In other aspects, the fourth embodiment may be substantially the same as the second embodiment described with reference to FIGS. 7 to 10 or the third embodiment described with reference to FIG. 11.

7. Examples of Sensor

7.1 First Example

Figure 14:
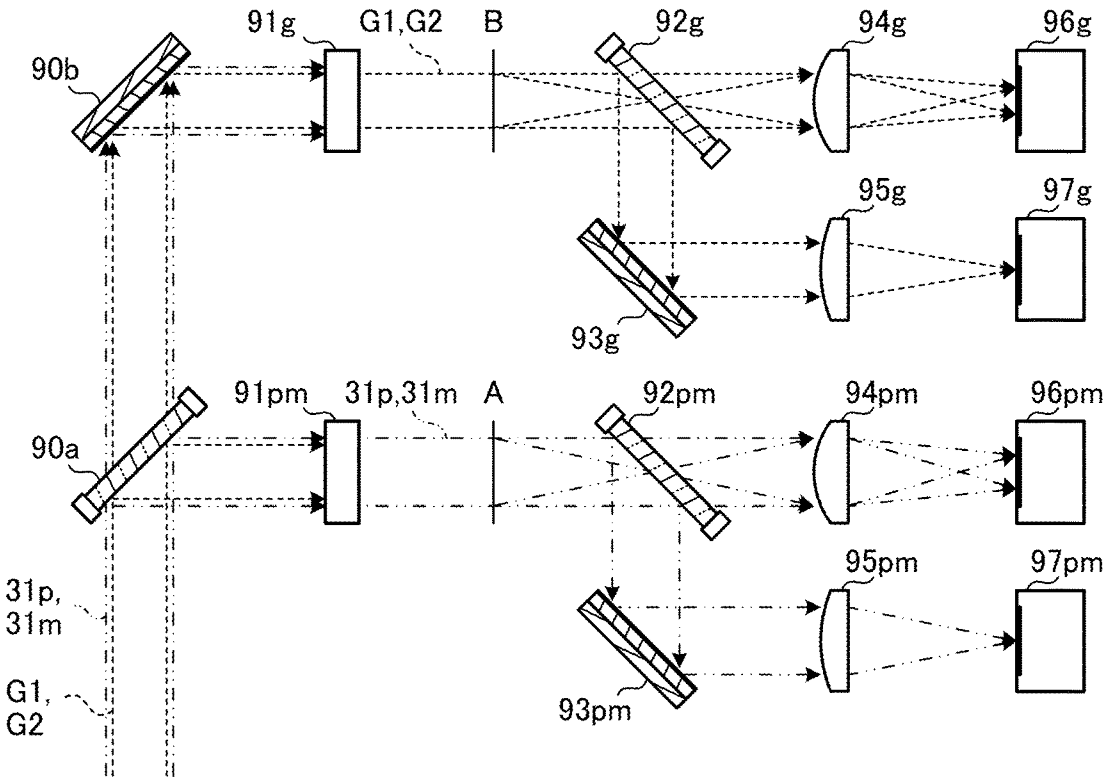
FIG. 14 schematically shows a first example of a sensor 413 used in the embodiments described above.

FIG. 14 schematically shows a first example of the sensor 413 used in the embodiments described above. The sensor 413 may acquire data to calculate the beam position and the pointing for each of the pre-pulse laser beam 31*p*, the main pulse laser beam 31*m*, and the first and second guide laser beams G1 and G2. The sensor 413 may have the following configuration.

7.1.1 Configuration

The sensor 413 in the first example may include a beam splitter 90*a*, a high-reflective mirror 90*b*, band-pass filters 91*pm* and 91*g*, beam splitters 92*pm* and 92*g*, and high-reflective mirrors 93*pm* and 93*g*. The sensor 413 may further include transfer optical systems 94*pm* and 94*g*, focusing optical systems 95*pm* and 95*g*, and beam profilers 96*pm*, 96*g*, 97*pm*, and 97*g*.

The beam splitter 90*a* may divide the light incident on the sensor 413 from the lower side in FIG. 14 into reflected light and transmitted light. Each of the reflected light and the transmitted light may include a part of the pre-pulse laser beam 31*p*, a part of the main pulse laser beam 31*m*, a part of the first guide laser beam G1, and a part of the second guide laser beam G2.

The band-pass filter 91*pm* may be provided in the optical path of the reflected light reflected by the beam splitter 90*a*. The band-pass filter 91*pm* may transmit the pre-pulse laser beam 31*p* and the main pulse laser beam 31*m*, and absorb or reflect the other beams. The first and second guide laser beams G1 and G2 may be absorbed or reflected by the band-pass filter 91*pm*.

The beam splitter 92*pm* may be provided in the optical path of the pre-pulse laser beam 31*p* and the main pulse laser beam 31*m* transmitted by the band-pass filter 91*pm*. The beam splitter 92*pm* may divide each of the pre-pulse laser beam 31*p* and the main pulse laser beam 31*m* into reflected light and transmitted light.

The high-reflective mirror 93*pm*, the focusing optical system 95*pm*, and the beam profiler 97*pm* may be provided in the optical path of the reflected light reflected by the beam splitter 92*pm*. The high-reflective mirror 93*pm* may reflect the reflected light reflected by the beam splitter 92*pm* toward the focusing optical system 95*pm*. The focusing optical system 95*pm* may concentrate the reflected light reflected by the beam splitter 92*pm* on the light receiving surface of the beam profiler 97*pm*.

The transfer optical system 94*pm* and the beam profiler 96*pm* may be provided in the optical path of the transmitted light transmitted by the beam splitter 92*pm*. The transfer optical system 94*pm* may form images of the beam cross-sections at position A in the optical paths of the pre-pulse laser beam 31*p* and the main pulse laser beam 31*m* on the light receiving surface of the beam profiler 96*pm*.

The high-reflective mirror 90*b* and the band-pass filter 91*g* may be provided in the optical path of the transmitted light transmitted by the beam splitter 90*a*. The high-reflective mirror 90*b* may reflect the transmitted light transmitted by the beam splitter 90*a* toward the band-pass filter 91*g*. The band-pass filter 91*g* may transmit the first and second guide laser beams G1 and G2, and absorb or reflect the other beams. The pre-pulse laser beam 31*p* and the main pulse laser beam 31*m* may be absorbed or reflected by the band-pass filter 91*g*.

The beam splitter 92*g* may be provided in the optical paths of the first and second guide laser beams G1 and G2 transmitted by the band-pass filter 91*g*. The beam splitter 92*g* may divide each of the first and second guide laser beams G1 and G2 into reflected light and transmitted light.

The high-reflective mirror 93*g*, the focusing optical system 95*g*, and the beam profiler 97*g* may be provided in the optical path of the reflected light reflected by the beam splitter 92*g*. The high-reflective mirror 93*g* may reflect the reflected light reflected by the beam splitter 92*g* toward the focusing optical system 95*g*. The focusing optical system 95*g* may concentrate the reflected light reflected by the beam splitter 92*g* on the light receiving surface of the beam profiler 97*g*.

The transfer optical system 94*g* and the beam profiler 96*g* may be provided in the optical path of the transmitted light transmitted by the beam splitter 92*g*. The transfer optical system 94*g* may form images of beam cross-sections at a position B in the optical paths of the first and second guide laser beams G1 and G2 on the light receiving surface of the beam profiler 96*g*.

7.1.2 Operation

The EUV light generation controller 5 may receive data on light intensity distributions of the pre-pulse laser beam 31*p* and the main pulse laser beam 31*m* imaged on the light receiving surface of the beam profiler 96*pm*. The EUV light generation controller 5 may calculate the beam positions of the pre-pulse laser beam 31*p* and the main pulse laser beam 31*m* based on the images of the beam cross-sections included in the data on the light intensity distributions.

The EUV light generation controller 5 may receive data on light intensity distributions of the pre-pulse laser beam 31*p* and the main pulse laser beam 31*m* concentrated on the light receiving surface of the beam profiler 97*pm*. The EUV light generation controller 5 may calculate the focus positions based on the data on the light intensity distributions. The EUV light generation controller 5 may then calculate the pointing of the pre-pulse laser beam 31*p* and the pointing of the main pulse laser beam 31*m* based on the calculated focus positions.

The EUV light generation controller 5 may receive data on light intensity distributions of the first and second guide laser beams G1 and G2 imaged on the light receiving surface of the beam profiler 96*g*. The EUV light generation controller 5 may calculate the beam positions of the first and second guide laser beams G1 and G2 based on the images of the bears; cross-sections included in the data on the light intensity distributions.

The EUV light generation controller 5 may receive data on light intensity distributions of the first and second guide laser beams G1 and G2 concentrated on the light receiving surface of the beam profiler 97*g*. The EUV light generation controller 5 may calculate the focus positions based on the data on the light intensity distributions. The EUV light generation controller 5 may then calculate the pointing of the first guide laser beam G1 and the pointing of the second guide laser beam G2 based on the calculated focus positions.

According to the first example, the separate beam profilers 97*pm* and 97*g* may be used to measure the pre-pulse laser beam 31*p* or the main pulse laser beam 31*m* and to measure the first or second guide laser beam G1 or G2, respectively. Further, the separate beam profilers 96*pm* and 96*g* may be used to measure the pre-pulse laser beam 31*p* or the main pulse laser beam 31*m* and to measure the first or second guide laser beam G1 or G2, respectively. Accordingly, the measurement of the pre-pulse laser beam 31*p* or the main pulse laser beam 31*m* and the measurement of the first or second guide laser beam G1 or G2 may be performed in parallel and thus the periodic time of control may be shortened. Further, even if the beam profiler 97*pm* or the beam profiler 96*pm* breaks down, a minimum necessary measurement may be possible using the beam profiler 97*g* or the beam profiler 96*g* by replacing the band-pass filter 91*g*, for example.

7.2 Second Example

Figure 15:
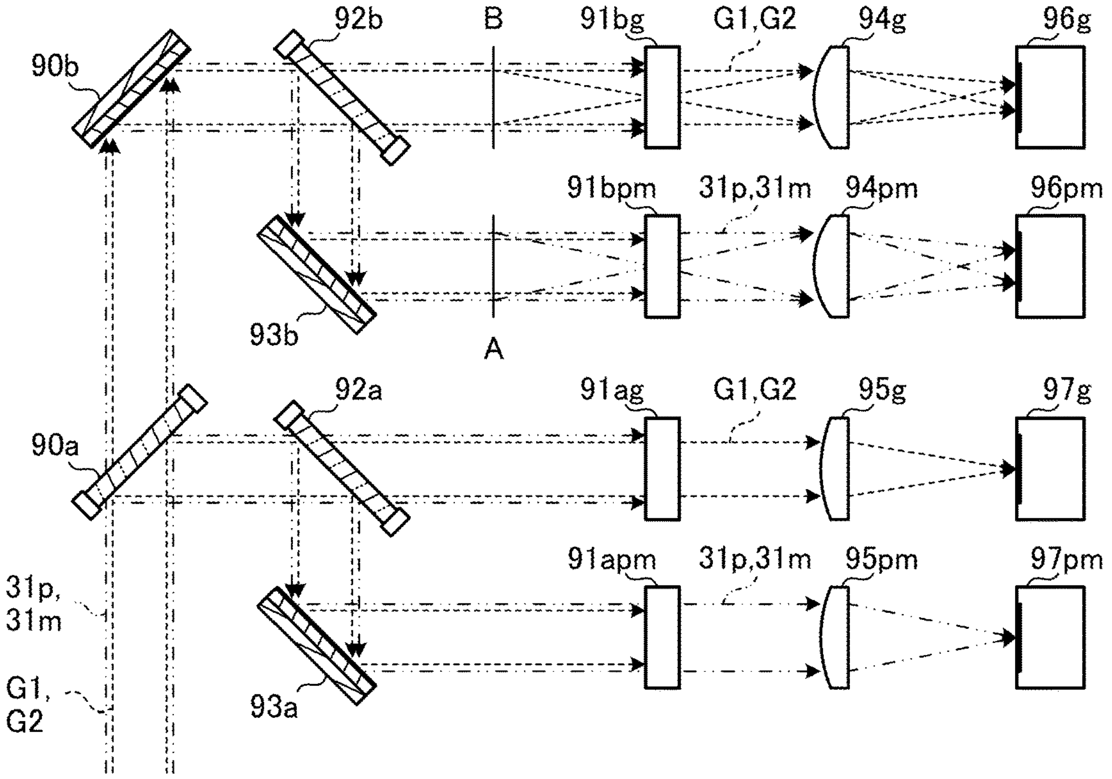
FIG. 15 schematically shows a second example of the sensor 413 used in the embodiments described above.

FIG. 15 schematically shows a second example of the sensor 413 used in the embodiments described above. In the second example of the sensor 413, band-pass filters 91*apm*, 91*ag*, 91*bpm*, and 91*bg* may be provided in the respective optical paths after being divided by beam splitters 92*a* and 92*b*. Specifically, the sensor 413 may have the following configuration.

The second example of the sensor 413 may include a beam splitter 90*a*, a high-reflective mirror 90*b*, the band-pass filters 91*apm*, 91*ag*, 91*bpm*, and 91*bg*, the beam splitters 92*a* and 92*b*, and high-reflective mirrors 93*a* and 93*b*. The sensor 413 may further include transfer optical systems 94*pm* and 94*g*, focusing optical systems 95*pm* and 95*g*, and beam profilers 96*pm*, 96*g*, 97*pm*, and 97*g*.

The beam splitter 90*a* may divide the light incident on the sensor 413 from the lower side in FIG. 15 into reflected light and transmitted light. Each of the reflected light and the transmitted light may include a part of the pre-pulse laser beam 31*p*, a part of the main pulse laser beam 31*m*, a part of the first guide laser beam G1, and a part of the second guide laser beam G2.

The beam splitter 92*a* may be provided in the optical path of the reflected light reflected by the beam splitter 90*a*. The beam splitter 92*a* may further divide the reflected light reflected by the beam splitter 90*a* into reflected light and transmitted light.

The high-reflective mirror 93*a*, the band-pass filter 91*apm*, the focusing optical system 95*pm*, and the beam profiler 97*pm* may be provided in the optical path of the reflected light reflected by the beam splitter 92*a*, The high-reflective mirror 93*a* may reflect the reflected light reflected by the beam splitter 92*a* toward the band-pass filter 91*apm*. The band-pass filter 91*apm* may transmit the pre-pulse laser beam 31*p* and the main pulse laser beam 31*m*, and absorb or reflect the other beams. The first and second guide laser beams G1 and G2 may be absorbed or reflected by the band-pass filter 91*apm*. The focusing optical system 95*pm* may concentrate the pre-pulse laser beam 31*p* and the main pulse laser beam 31*m* each transmitted by the band-pass filter 91*apm* on the light receiving surface of the beam profiler 97*pm*.

The band-pass filter 91*ag*, the focusing optical system 95*g*, and the beam profiler 97*g* may be provided in the optical path of the transmitted light transmitted by the beam splitter 92*a*. The band-pass filter 91*ag* may transmit the first and second guide laser beams G1 and G2, and absorb or reflect the other beams. The pre-pulse laser beam 31*p* and the main pulse laser beam 31*m* may be absorbed or reflected by the band-pass filter 91*ag*. The focusing optical system 95*g* may concentrate the first and second guide laser beams G1 and G2 each transmitted by the band-pass filter 91*ag* on the light receiving surface of the beam profiler 97*g*.

The high-reflective mirror 90*b* and the beam splitter 92*b* may be provided in the optical path of the transmitted light transmitted by the beam splitter 90*a*. The high-reflective mirror 90*b* may reflect the transmitted light transmitted by the beam splitter 90*a* toward the beam splitter 92*b*. The beam splitter 92*b* may further divide the transmitted light transmitted by the beam splitter 90*a* into reflected light and transmitted light.

The high-reflective mirror 93*b*, the band-pass filter 91*bpm*, the transfer optical system 94*pm*, and the beam profiler 96*pm* may be provided in the optical path of the reflected light reflected by the beam splitter 92*b*. The high-reflective mirror 93*b* may reflect the reflected light reflected by the beam splitter 92*b* toward the band-pass filter 91*bpm*. The band-pass filter 91*bpm* may transmit the pre-pulse laser beam 31*p* and the main pulse laser beam 31*m*, and absorb or reflect the other beams. The first and second guide laser beams G1 and G2 may be absorbed or reflected by the band-pass filter 91*bpm*. The transfer optical system 94*pm* may form images of beam cross-sections at a position A in the optical paths of the pre-pulse laser beam 31*p* and the main pulse laser beam 31*m* on the light receiving surface of the beam profiler 96*pm*.

The band-pass filter 91*bg*, the transfer optical system 94*g*, and the beam profiler 96*g* may be provided in the optical path of the transmitted light transmitted by the beam splitter 92*b*. The band-pass filter 91*bg* may transmit the first and second guide laser beams G1 and G2, and absorb or reflect the other beams. The pre-pulse laser beam 31*p* and the main pulse laser beam 31*m* may be absorbed or reflected by the band-pass filter 91*bg*. The transfer optical system 94*g* may form images of beam cross-sections at a position B in the optical paths of the first and second guide laser beams G1 and G2 on the light receiving surface of the beam profiler 96*g*.

According to the second example, the separate beam profilers 97*pm* and 97*g* may be used to measure the pre-pulse laser beam 31*p* or the main pulse laser beam 31*m* and to measure the first or second guide laser beam G1 or G2, respectively. Further, the separate beam profilers 96*pm* and 96*g* may be used to measure the pre-pulse laser beam 31*p* or the main pulse laser beam 31*m* and to measure the first or second guide laser beam G1 or G2, respectively. Accordingly, the measurement of the pre-pulse laser beam 31*p* or the main pulse laser beam 31*m* and the measurement of the first or second guide laser beam G1 or G2 may be performed in parallel and thus the periodic time of control may be shortened. Further, even if the beam profiler 97*pm* breaks down, a minimum necessary measurement may be possible using the beam profiler 97*g* by replacing the band-pass filter 91*ag*, for example. Even if the beam profiler 96*pm* breaks down, a minimum necessary measurement may be possible using the beam profiler 96*g* by replacing the band-pass filter 91*bg*, for example.

In other aspects, the second example may be substantially the same as the first example described with reference to FIG. 14.

7.3 Third Example

Figure 16A:
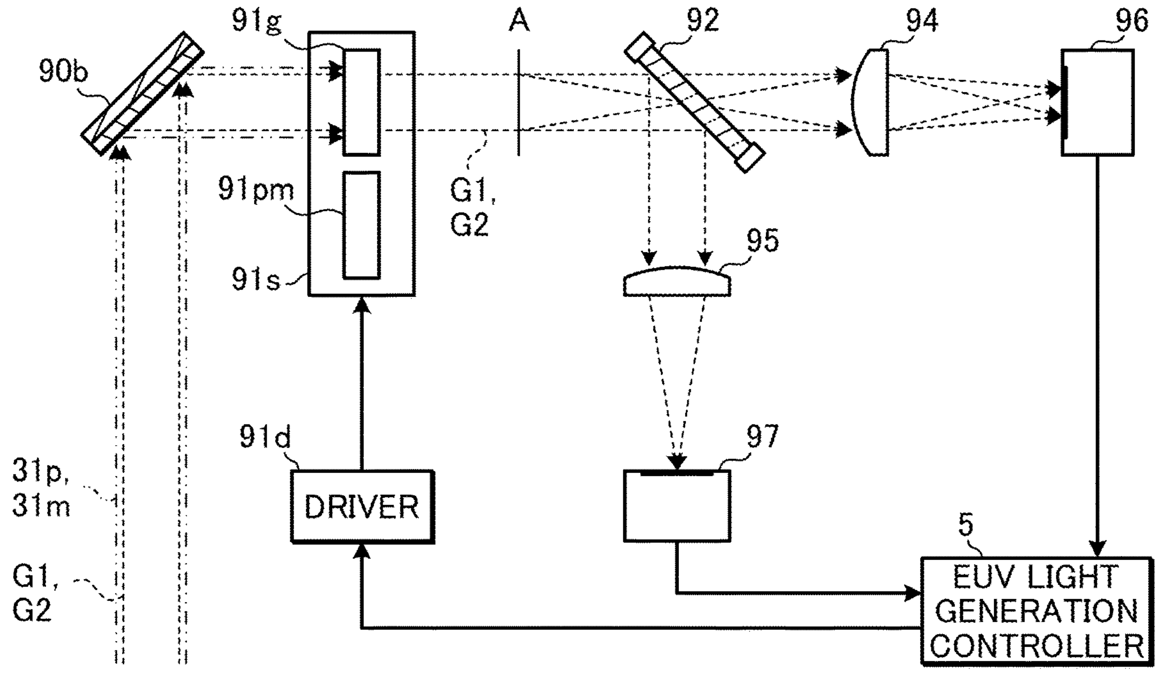
FIGS. 16A and 16B schematically show a third example of the sensor 413 used in the embodiments described above.
Figure 16B:
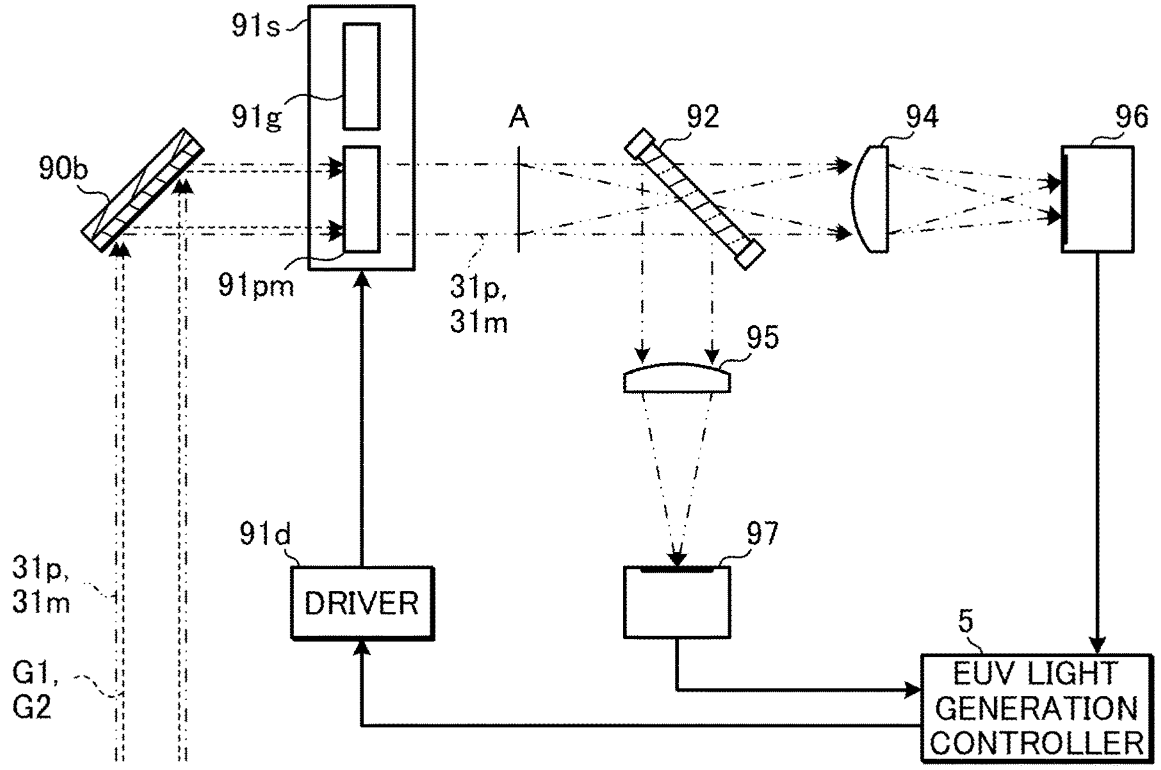

FIGS. 16A and 16B schematically show a third example of the sensor 413 used in the embodiments described above. The third example of the sensor 413 may include band-pass filters 91*pm* and 91*g* capable of being switched to each other by a stage 91*s*. FIG. 16A shows a situation where the band-pass filter 91*g* is active. FIG. 16B shows another situation where the band-pass filter 91*pm* is active. Specifically, the sensor 413 may have the following configuration.

7.3.1 Configuration

The third example of the sensor 413 may include a high-reflective mirror 9*Gb*, the band-pass filters 91*pm* and 91*g*, the stage 91*s*, and a beam splitter 92. The sensor 413 may further include a transfer optical system 94, a focusing optical system 95, and beam profilers 96 and 97.

The high-reflective mirror 90*b* may reflect the light incident on the sensor 413. The reflected light reflected by the high-reflective mirror 90*b* may include the pre-pulse laser beam 31*p*, the main pulse laser beam 31*m*, and the first and second guide laser beams G1 and G2.

The stage 91*s* may be capable of switching the positions of the band-pass filters 91*pm* and 91*g*, such that one of the band-pass filters 91*pm* and 91*g* is in the optical path of the reflected light reflected by the high-reflective mirror 90*b*.

The stage 91*s* may be driven by a driver 91*d* controlled by the EUV light generation controller 5.

The beam splitter 92 may divide the light transmitted by one of the band-pass filters 91*pm* and 91*g* into reflected light and transmitted light.

The focusing optical system 95 and the beam profiler 97 may be provided in the optical path of the reflected light reflected by the beam splitter 92. The focusing optical system 95 may concentrate the reflected light reflected by the beam splitter 92 on the light receiving surface of the beam profiler 97.

The transfer optical system 94 and the beam profiler 96 may be provided in the optical path of the transmitted light transmitted by the beam splitter 92. The transfer optical system 94 may form an image of a beam cross-section at a position. A in the optical path of the light transmitted by one of the band-pass filters 91*pm* and 91*g* on the light receiving surface of the beam profiler 96.

7.3.2 Operation

As shown in FIG. 16B, the band-pass filter 91*pm* may move to the optical path of the reflected light reflected by the high-reflective mirror 90*b*. The band-pass filter 91*pm* may transmit the pre-pulse laser beam 31*p* and the main pulse laser beam 31*m*, and absorb or reflect the other beams.

In this case, the EUV light generation controller 5 may receive data on light intensity distributions of the pre-pulse laser beam 31*p* and the main pulse laser beam 31*m* imaged on the light receiving surface of the beam profiler 96. The EUV light generation controller 5 may calculate the beam positions of the pre-pulse laser beam 31*p* and the main pulse laser beam 31*m* based on the images of the beam cross-sections included in the data on the light intensity distributions.

The EUV light generation controller 5 may further receive data on light intensity distributions of the pre-pulse laser beam 31*p* and the main pulse laser beam 31*m* concentrated on the light receiving surface of the beam profiler 97. The EUV light generation controller 5 may calculate the focus positions based on the data on the light intensity distributions. The EUV light generation controller 5 may then calculate the pointing of the pre-pulse laser beam 31*p* and the pointing of the main pulse laser beam 31*m* based on the focus positions.

As shown in FIG. 16A, the band-pass filter 91*g* may move to the optical path of the reflected light reflected by the high-reflective mirror 90*b*. The band-pass filter 91*g* may transmit the first and second guide laser beams G1 and G2, and absorb or reflect the other beams.

In this case, the EUV light generation controller 5 may receive data on light intensity distributions of the first and second guide laser beams G1 and G2 imaged on the light receiving surface of the beam profiler 96. The EUV light generation controller 5 may calculate the beam positions of the first and second guide laser beams G1 and G2 based on the images of the beam cross-sections included in the data on the light intensity distributions.

The EUV light generation controller 5 may further receive data on light intensity distributions of the first and second guide laser beams G1 and G2 concentrated on the light receiving surface of the beam profiler 97. The EUV light generation controller 5 may calculate the focus positions based on the data on the light intensity distributions. The EUV light generation controller 5 may then calculate the pointing of the first guide laser beam G1 and the pointing of the second guide laser beam G2 based on the focus positions.

According to the third example, the focusing optical system 95 and the beam profiler 97 may be commonly used to measure the pre-pulse laser beam 31*p*, the main pulse laser beam 31*m*, and the first and second guide laser beams G1 and G2. Further, the transfer optical system 94 and the beam profiler 96 may be commonly used to measure the pre-pulse laser beam 31*p*, the main pulse laser beam 31*m*, and the first and second guide laser beams G1 and G2. This may stabilize the accuracy of detection of the beam position and the accuracy of detection of the pointing.

In other aspects, the third example may be substantially the same as the first example described with reference to FIG. 14.

8. Configuration of Controller

Figure 17:
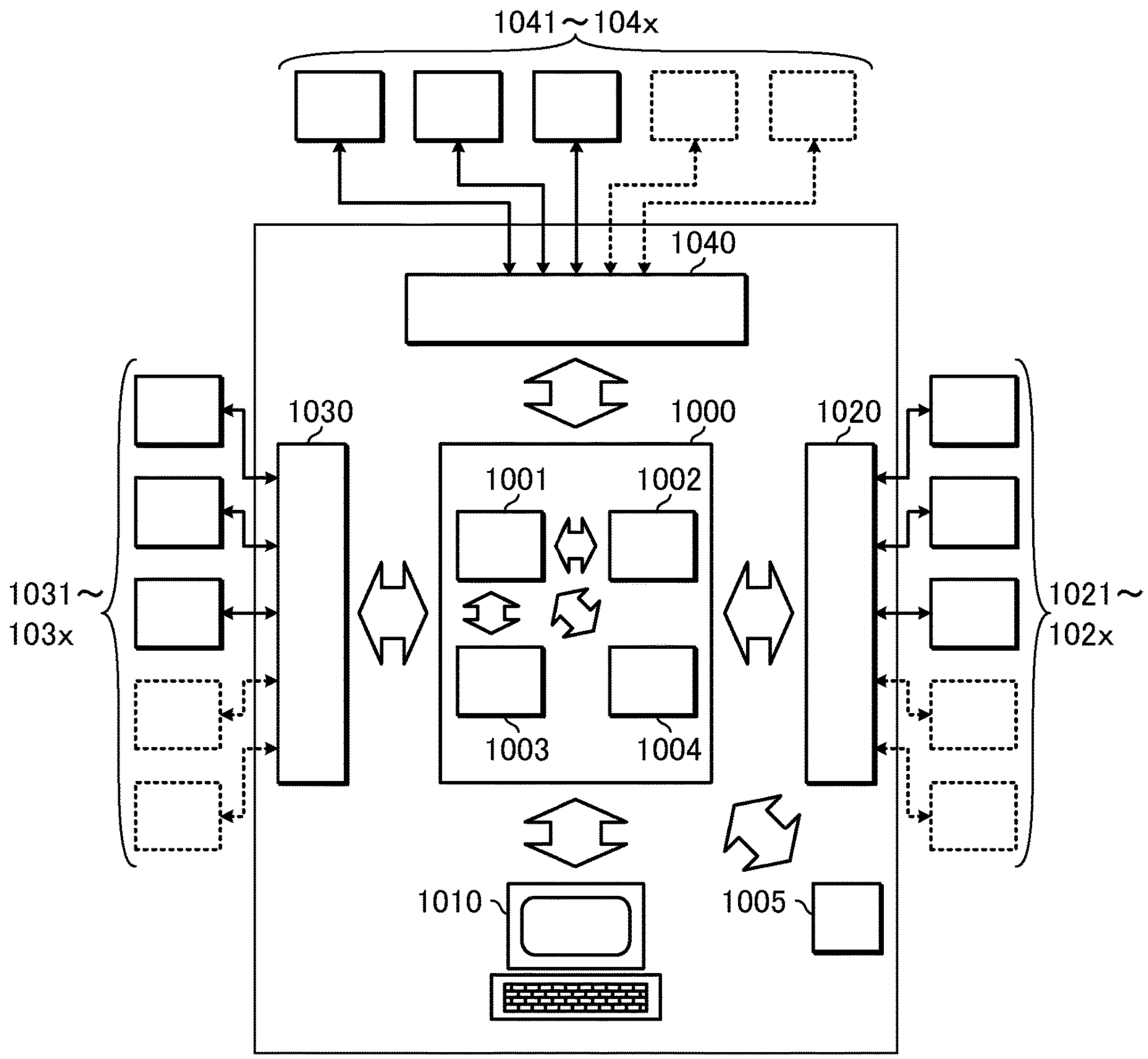
FIG. 17 is a block diagram showing a general configuration of a controller.

FIG. 17 is a block diagram showing a general configuration of the controller.

Controllers of the above-described embodiments, such as the EUV light generation controller 5, may be configured by general-purpose control devices such as computers or programmable controllers. For example, the controllers may be configured as follows.

Configuration

The controllers may each be configured by a processor 1000, and a storage memory 1005, a user interface 1010, a parallel input/output (I/O) controller 1020, a serial I/O controller 1030, and an analog-to-digital (A/D) and digital-to-analog (D/A) converter 1040 which are connected to the processor 1000. The processor 1000 may be configured by a central processing unit (CPU) 1001, and a memory 1002, a timer 1003, and a graphics processing unit (GPU) 1004 which are connected to the CPU 1001.

Operation

The processor 1000 may read a program stored in the storage memory 1005. The processor 1000 may also execute the read program, read data from the storage memory 1005 in accordance with the program, or store data in the storage memory 1005.

The parallel I/O controller 1020 may be connected to devices 1021 to 102*x* with which it may communicate through parallel I/O ports. The parallel I/O controller 1020 may control digital-signal communication through the parallel I/O ports while the processor 1000 executes the program.

The serial I/O controller 1030 may be connected to devices 1031 to 103*x* with which it may communicate through serial I/O ports. The serial I/O controller 1030 may control digital-signal communication through the serial I/O ports while the processor 1000 executes the program.

The A/D and D/A converter 1040 may be connected to devices 1041 to 104*x* with which it may communicate through analog ports. The A/D and D/A converter 1040 may control analog-signal communication through the analog ports while the processor 1000 executes the program.

The user interface 1010 may be configured to display the progress of the program being executed by the processor 1000 in accordance with instructions from an operator. The user interface 1010 may allow the processor 1000 to stop the execution of the program or to perform an interrupt in accordance with instructions from the operator.

The CPU 1001 of the processor 1000 may perform arithmetic processing of the program. The memory 1002 may temporarily store the program being executed by the CPU 1001 or temporarily store data in the arithmetic processing. The timer 1003 may measure time or elapsed time and output it to the CPU 1001 in accordance with the program being executed. When image data is inputted to the processor 1000, the GPU 1004 may process the image data in accordance with the program being executed and output the results to the CPU 1001.

The devices 1021 to 102x, which are connected through the parallel I/O ports to the parallel I/O controller 1020, may be the laser apparatus 3, the exposure apparatus 5, other controllers, or the like.

The devices 1031 to 103x, which are connected through the serial I/O ports to the serial I/O controller 1030, may be the target supply unit 26, the actuator 84 for the laser beam focusing optical system, or the like.

The devices 1041 to 104x, which are connected through the analog ports to the A/D and D/A converter 1040, may be various sensors such as the target camera 80, or the like.

The controllers thus configured may be capable of realizing the operations described in the embodiments.

The above descriptions are intended to be only illustrative rather than being limiting. Accordingly, it will be clear to those skilled in the art that various changes may be made to the embodiments of the present disclosure without departing from the scope of the appended claims.

The terms used in this specification and the appended claims are to be interpreted as not being limiting. For example, the term "include" or "included" should be interpreted as not being limited to items described as being included. Further, the term "have" should be interpreted as not being limited to items described as being had. Furthermore, the modifier "a" or "an" as used in this specification and the appended claims should be interpreted as meaning "at least one" or "one or more".

The invention claimed is:

1. An extreme ultraviolet light generating apparatus comprising:

a target supply unit configured to output a target toward a predetermined region;

a driver laser configured to output a driver laser beam with which the target is irradiated;

a guide laser configured to output a guide laser beam;

a beam combiner configured to have an optical path of the driver laser beam outputted from the driver laser and an optical path of the guide laser beam outputted from the guide laser substantially coincide with each other and output the driver laser beam and the guide laser beam;

a first optical element including a first actuator configured to adjust an optical path of the driver laser beam to be incident on the beam combiner;

a second optical element including a second actuator configured to adjust an optical path of the guide laser beam to be incident on the beam combiner;

a sensor configured to detect the guide laser beam outputted from the beam combiner to output detected data; and a controller including a memory and a CPU connected to the memory, the controller being configured to receive the detected data on the guide laser beam detected by the sensor, control the second actuator based on the detected data, and control the first actuator based on an amount of controlling of the second actuator.

2. The extreme ultraviolet light generating apparatus according to claim 1, wherein the controller is configured to receive the detected data on the guide laser beam detected by the sensor, control the second actuator based on the detected data, and control the first actuator based on the amount of controlling of the second actuator, while the driver laser beam is not outputted.

3. The extreme ultraviolet light generating apparatus according to claim 1, further comprising:

a third optical element including a third actuator configured to adjust optical paths of the driver laser beam and the guide laser beam each outputted from the beam combiner, wherein the sensor detects the guide laser beam outputted from the third optical element to output the detected data and second detected data, and the controller is further configured to receive the second detected data on the guide laser beam detected by the sensor after the second actuator is controlled based on the detected data and control the third actuator based on the second detected data.

4. The extreme ultraviolet light generating apparatus according to claim 3, wherein the sensor further detects the driver laser beam outputted from the third optical element to output third detected data and fourth detected data and detects the guide laser beam outputted from the third optical element to output fifth detected data, and the controller is configured to receive the third detected data on the driver laser beam detected by the sensor, control the first actuator based on the third detected data, receive the fourth detected data on the driver laser beam detected by the sensor after the first actuator is controlled based on the third detected data, control the third actuator based on the fourth detected data, receive the fifth detected data on the guide laser beam detected by the sensor, and control the second actuator based on the fifth detected data, while the driver laser beam is outputted.

5. The extreme ultraviolet light generating apparatus according to claim 1, further comprising:

a third optical element including a third actuator configured to adjust optical paths of the driver laser beam outputted from the driver laser and the guide laser beam outputted from the guide laser; and an image sensor configured to detect an image of reflected light reflected by the target irradiated with the guide laser beam, wherein the controller is configured to control the third actuator based on an output from the image sensor.

6. The extreme ultraviolet light generating apparatus according to claim 5, wherein the beam combiner outputs the driver laser beam and the guide laser beam toward the third optical element.

7. The extreme ultraviolet light generating apparatus according to claim 5, wherein the image sensor detects the image of the reflected light reflected by the target irradiated with the guide laser beam while the driver laser beam is not outputted.

8. The extreme ultraviolet light generating apparatus according to claim 5, wherein the driver laser includes a pre-pulse laser configured to output a pre-pulse laser beam with which the target is irradiated and a main pulse laser configured to output a main pulse laser beam with which the target is irradiated after the target is irradiated with the pre-pulse laser beam, and the third optical element adjusts an optical path of at least one of the pre-pulse laser beam and the main pulse laser beam and an optical path of the guide laser beam.

9. The extreme ultraviolet light generating apparatus according to claim 5, wherein the controller is configured to calculate a position of the guide laser beam in a direction intersecting a photographing direction of the image sensor based on a position of the image of the reflected light reflected by the target irradiated with the guide laser beam, calculate a position of the guide laser beam in a direction substantially parallel to the photographing direction of the image sensor based on a size of the image of the reflected light reflected by the target irradiated with the guide laser beam, and control the third actuator based on the position of the guide laser beam in the direction intersecting the photographing direction of the image sensor and the position of the guide laser beam in the direction substantially parallel to the photographing direction of the image sensor.

10. The extreme ultraviolet light generating apparatus according to claim 5, wherein the controller is configured to calculate a position of the guide laser beam in a direction intersecting a photographing direction of the image sensor based on a position of the image of the reflected light reflected by the target irradiated with the guide laser beam, calculate a position of the guide laser beam in a direction substantially parallel to the photographing direction of the image sensor based on a brightness of the image of the reflected light reflected by the target irradiated with the guide laser beam, and control the third actuator based on the position of the guide laser beam in the direction intersecting the photographing direction of the image sensor and the position of the guide laser beam in the direction substantially parallel to the photographing direction of the image sensor.

11. An extreme ultraviolet light generating apparatus comprising:

a target supply unit configured to output a target toward a predetermined region;

a pre-pulse laser configured to output a pre-pulse laser beam with which the target is irradiated;

a main pulse laser configured to output a main pulse laser beam with which the target is irradiated after the target is irradiated with the pre-pulse laser beam;

a first guide laser configured to output a first guide laser beam;

a second guide laser configured to output a second guide laser beam;

a first beam combiner configured to have an optical path of the pre-pulse laser beam outputted from the pre-pulse laser and an optical path of the first guide laser beam outputted from the first guide laser substantially coincide with each other and output the pre-pulse laser beam and the first guide laser beam;

a second beam combiner configured to have an optical path of the main pulse laser beam outputted from the main pulse laser and an optical path of the second guide laser beam outputted from the second guide laser substantially coincide with each other and output the main pulse laser beam and the second guide laser beam;

a first optical element including a first actuator configured to adjust an optical path of the pre-pulse laser beam to be incident on the first beam combiner;

a second optical element including a second actuator configured to adjust an optical path of the first guide laser beam to be incident on the first beam combiner;

a third optical element including a third actuator configured to adjust optical paths of the pre-pulse laser beam and the first guide laser beam each outputted from the first beam combiner;

a fourth optical element including a fourth actuator configured to adjust an optical path of the main pulse laser beam to be incident on the second beam combiner;

a fifth optical element including a fifth actuator configured to adjust an optical path of the second guide laser beam to be incident on the second beam combiner;

a sixth optical element including a sixth actuator configured to adjust optical paths of the main pulse laser beam and the second guide laser beam each outputted from the second beam combiner;

a third beam combiner configured to have an optical path of the pre-pulse laser beam outputted from the third optical element and an optical path of the main pulse laser beam outputted from the sixth optical element substantially coincide with each other and have an optical path of the first guide laser beam outputted from the third optical element and an optical path of the second guide laser beam outputted from the sixth optical element substantially coincide with each other;

a sensor configured to detect the first and second guide laser beams outputted from the third beam combiner to output detected data; and a controller including a memory and a CPU connected to the memory, the controller being configured to control the second actuator based on the detected data on the first guide laser beam detected by the sensor, control the first actuator based on an amount of controlling of the second actuator, control the fifth actuator based on the detected data on the second guide laser beam detected by the sensor, and control the fourth actuator based on an amount of controlling of the fifth actuator.

12. The extreme ultraviolet light generating apparatus according to claim 11, wherein the controller is configured to receive the detected data on the first guide laser beam detected by the sensor, control the second actuator based on the detected data on the first guide laser beam, and control the first actuator based on the amount of controlling of the second actuator, while the pre-pulse laser beam is not outputted.

13. The extreme ultraviolet light generating apparatus according to claim 11, wherein the sensor detects the first guide laser beam outputted from the third optical element to output the detected data and second detected data, and the controller is further configured to receive the second detected data on the first guide laser beam detected by the sensor after the second actuator is controlled based on the detected data and control the third actuator based on the second detected data.

14. The extreme ultraviolet light generating apparatus according to claim 13, wherein the sensor further detects the pre-pulse laser beam outputted from the third optical element to output third detected data and fourth detected data and detects the first guide laser beam outputted from the third optical element to output fifth detected data, and the controller is configured to receive the third detected data on the pre-pulse laser beam detected by the sensor, control the first actuator based on the third detected data, receive the fourth detected data on the pre-pulse laser beam detected by the sensor after the first actuator is controlled based on the third detected data, control the third actuator based on the fourth detected data, receive the fifth detected data on the first guide laser beam detected by the sensor, and control the second actuator based on the fifth detected data, while the pre-pulse laser beam is outputted.

15. An extreme ultraviolet light generating apparatus comprising:

a target supply unit configured to output a target toward a predetermined region;

a driver laser configured to output a driver laser beam with which the target is irradiated;

a guide laser configured to output a guide laser beam with which the target is irradiated;

an optical element including an actuator configured to adjust optical paths of the driver laser beam outputted from the driver laser and the guide laser beam outputted from the guide laser;

an image sensor configured to detect an image of reflected light reflected by the target irradiated with the guide laser beam; and a controller including a memory and a CPU connected to the memory, the controller being configured to control the actuator based on an output from the image sensor.

16. The extreme ultraviolet light generating apparatus according to claim 15, further comprising:

a beam combiner configured to have an optical path of the driver laser beam outputted from the driver laser and an optical path of the guide laser beam outputted from the guide laser substantially coincide with each other and output the driver laser beam and the guide laser beam toward the optical element.

17. The extreme ultraviolet light generating apparatus according to claim 15, wherein the image sensor detects the image of the reflected light reflected by the target irradiated with the guide laser beam while the driver laser beam is not outputted.

18. The extreme ultraviolet light generating apparatus according to claim 15, wherein the driver laser includes a pre-pulse laser configured to output a pre-pulse laser beam with which the target is irradiated and a main pulse laser configured to output a main pulse laser beam with which the target is irradiated after the target is irradiated with the pre-pulse laser beam, and the optical element adjusts an optical path of one of the pre-pulse laser beam and the main pulse laser beam and an optical path of the guide laser beam.

19. The extreme ultraviolet light generating apparatus according to claim 15, wherein the controller is configured to calculate a position of the guide laser beam in a direction intersecting a photographing direction of the image sensor based on a position of the image of the reflected light reflected by the target irradiated with the guide laser beam, calculate a position of the guide laser beam in a direction substantially parallel to the photographing direction of the image sensor based on a size of the image of the reflected light reflected by the target irradiated with the guide laser beam, and control the actuator based on the position of the guide laser beam in the direction intersecting the photographing direction of the image sensor and the position of the guide laser beam in the direction substantially parallel to the photographing direction of the image sensor.

20. The extreme ultraviolet light generating apparatus according to claim 15, wherein the controller is configured to calculate a position of the guide laser beam in a direction intersecting a photographing direction of the image sensor based on a position of the image of the reflected light reflected by the target irradiated with the guide laser beam, calculate a position of the guide laser beam in a direction substantially parallel to the photographing direction of the image sensor based on a brightness of the image of the reflected light reflected by the target irradiated with the guide laser beam, and control the actuator based on the position of the guide laser beam in the direction intersecting the photographing direction of the image sensor and the position of the guide laser beam in the direction substantially parallel to the photographing direction of the image sensor.

* * * * *